United States Patent [19]
Yamazaki et al.

[11] Patent Number: 5,821,497
[45] Date of Patent: Oct. 13, 1998

[54] LASER MARKING SYSTEM AND LASER MARKING METHOD

[75] Inventors: Taku Yamazaki, Pittsburgh, Pa.; Yukinori Matsumura; Yukihiro Tsuda, both of Isehara, Japan; Akira Mori, Chigasaki, Japan

[73] Assignee: Kabushiki Kaisha Seisakusho, Tokyo, Japan

[21] Appl. No.: 495,451

[22] PCT Filed: Jan. 20, 1994

[86] PCT No.: PCT/JP94/00069

§ 371 Date: Aug. 28, 1995

§ 102(e) Date: Aug. 28, 1995

[87] PCT Pub. No.: WO94/16858

PCT Pub. Date: Aug. 4, 1994

[30] Foreign Application Priority Data

Jan. 29, 1993 [JP] Japan .................................. 5-034418
Jan. 29, 1993 [JP] Japan .................................. 5-034419

[51] Int. Cl.⁶ .................................................. B23K 26/00
[52] U.S. Cl. .............................. 219/121.69; 219/121.68; 219/121.73
[58] Field of Search ...................... 219/121.68, 121.69, 219/121.82, 121.73; 359/202, 203, 204; 353/34, 36; 347/256, 258, 255, 229

[56] References Cited

U.S. PATENT DOCUMENTS

| 4,638,144 | 1/1987 | Latta, Jr. ............................ 219/121.68 |
| 4,818,835 | 4/1989 | Kuwabara et al. ................. 219/121.85 |
| 5,132,510 | 7/1992 | Klingel et al. ...................... 219/121.82 |
| 5,192,848 | 3/1993 | Miyakawa et al. ................. 219/121.82 |
| 5,260,542 | 11/1993 | Ishiguro et al. ................... 219/121.68 |
| 5,260,728 | 11/1993 | Yoshioka et al. ......................... 353/34 |
| 5,309,273 | 5/1994 | Mori et al. .......................... 219/121.68 |
| 5,608,563 | 3/1997 | Matsumara et al. ..................... 359/202 |

FOREIGN PATENT DOCUMENTS

| 215389 | 3/1987 | European Pat. Off. .......... 219/121.82 |
| 57-14981 | 1/1982 | Japan . |
| 2-15887 | 1/1990 | Japan . |
| 2-96714 | 4/1990 | Japan . |
| 2-187287 | 7/1990 | Japan . |
| 2-187288 | 7/1990 | Japan . |
| 2-268988 | 11/1990 | Japan . |
| 2-284786 | 11/1990 | Japan . |
| 4-169416 | 6/1992 | Japan . |
| 4-98384 | 8/1992 | Japan . |
| 4-339581 | 11/1992 | Japan .............................. 219/121.68 |
| 93-23781 | 11/1993 | WIPO . |

Primary Examiner—Geoffrey S. Evans
Attorney, Agent, or Firm—Sidley & Austin

[57] ABSTRACT

A laser marking system and method with a laser oscillator generating a laser beam that is scanned in a single direction onto a mask (such as a liquid crystal) that displays sequentially a plurality of divided pattern blocks, and a second deflector that deflects the scanned laser beams onto corresponding portions of the surface of a workpiece so as to mark on the surface of the workpiece a combination of the divided pattern blocks. In another embodiment a plurality of masks and a second optical system for combining the beams from the masks can be used to create the mark. The system can be used with a conveyor and a loading and unloading unit using a controller.

24 Claims, 14 Drawing Sheets

DISPLAY PATTERN ON FIRST
LIQUID CRYSTAL MASK

DISPLAY PATTERN ON SECOND
LIQUID CRYSTAL MASK

COMBINED DISPLAY PATTERN

LASER MARKING SYSTEM AND LASER MARKING METHOD

BACKGROUND OF THE INVENTION

1. Field of the Invention

The present invention relates to a laser marking system and a method of laser marking, and, in particular, to a laser marking system and a laser marking method suitable for marking identification numbers, letters, and the like on workpieces in semiconductor fabrication processes.

2. Description of the Related Art

Generally, when product numbers, other identification numbers, and letters are marked on workpieces by a laser marking apparatus, each of the workpieces is placed just below a laser emitting opening. After the workpiece has been marked, it is unloaded. For the apparatuses of this type, various technologies that identify workpiece types and align marking positions have been proposed so as to improve marking contents and alignment. In addition, to effectively mark workpieces, a high speed marking technology that quickly changes marking objects has been proposed (as Japanese Patent Laid-Open Publication No. 2-187288).

Although these technologies improve marking appearance, speed, and alignment accuracy, technologies that allow total operating efficiency with respect to workpiece conveying apparatus, operating type, or operation time to be improved as marking systems have not been yet disclosed. Thus, with these conventional technologies, a large number of workpieces cannot be effectively conveyed and quickly marked.

Generally, workpieces are marked by an ink jet system. In the ink jet system, a relative position between a workpiece and an ink jet nozzle is changed by a conveying apparatus. Thus, an interlocking operation between the conveying apparatus and the ink jet system is required (as disclosed in Japanese Patent Laid-Open Publication No. 57-14981).

Recently, as the size of workpieces such as semiconductor devices is decreasing, small marking numbers and letters and high marking accuracy are being required. Thus, laser marking systems are now being studied, instead of the ink jet systems. In a conventional laser marking apparatus, laser light generated by a laser oscillator is raster scanned by a deflector onto a mask surface. The workpiece surface is marked with the laser light that is transmitted by the mask. In reality, an entire mark to be marked is divided into several mark blocks. These mark blocks are sequentially displayed on a liquid crystal mask. By raster scanning laser light onto the liquid crystal mask, the transmitted light is radiated to the workpiece surface by the deflector. By repeating this operation sequence, the entire pattern is marked. This method is disclosed in Japanese Patent Laid-Open Publication No. 2-187287.

However, this laser marking apparatus requires that the deflectors raster scan the laser beam in the X and Y directions onto a pattern displayed on a mask. When the laser light that has been transmitted by the mask is deflected in the X and Y directions along the workpiece conveying line, another deflector, that deflects the divided pattern blocks along the workpiece plane, is required so as to combine these pattern blocks. Thus, the X and Y deflecting and scanning drive systems are required both in the laser beam incident optical path and in the mask transmitting optical path. Thus, in this related art reference, the scale of the apparatus is large, and the number of items to be controlled is large.

In addition, according to the laser marking apparatus having a liquid crystal mask, different patterns are displayed on the mask, one after the other. The positional accuracy of the marking depends on the dot pitch. In other words, a mark displayed on the mask depends on whether each dot thereof transmits the laser beam. Thus, a positional accuracy higher than the dot pitch cannot be obtained. Since a gap between dots is not marked, the resultant mark becomes unclear.

SUMMARY OF THE INVENTION

An object of the present invention is to provide a laser marking system and a method of laser marking for maximizing the efficiency of the entire operating timing of the marking operation against the workpiece loading/unloading operation of a workpiece conveying apparatus, for marking a large number of workpieces in a short time, for easily dividing a marking image into marking image blocks and combining these blocks into the original image, and for providing a high positional accuracy of the marking.

A first aspect of the present invention is a laser marking system, comprising a laser marking apparatus having a first deflector for raster scanning laser light generated by a laser oscillator onto a mask surface, a second deflector for radiating light transmitted therethrough onto a workpiece surface, and a workpiece conveying apparatus, wherein the improvement comprises a conveying apparatus having a feeder positioning unit, a feeder supply unit, and a feeder discharge unit, the feeder positioning unit being disposed at an irradiating position of the laser marking apparatus, the feeder supply unit being disposed upstream of the feeder positioning unit, the feeder discharge unit being disposed downstream of the feeder positioning unit; an installation plate for raising and lowering the conveying apparatus; a loader for loading a workpiece; an unloader for unloading a workpiece; a controller for totally controlling the conveying apparatus, the installation plate, the loader, and the unloader through a communication line; a production management host computer for transmitting and receiving signals to and from the controller so as to manage the marking process; and a marking data generating computer disposed in the laser marking apparatus.

The conveying apparatus can comprise the feeder positioning unit, a first feeder supply and discharge unit disposed on one side of the feeder positioning unit, a second feeder supply and discharge unit disposed on the opposite side of the feeder positioning unit, a first loader and unloader disposed outside the first feeder supply and discharge unit and adapted for loading and unloading a workpiece, and a second loader and unloader disposed outside the second feeder supply and discharge unit for loading and unloading a workpiece.

The laser marking apparatus comprises a first deflector for scanning in one direction the laser light radiated by the laser oscillator, a mask for displaying the pattern blocks of a marking pattern, divided corresponding to the scanning lines of laser light scanned by the first deflector; a second deflector for deflecting scanned light selectively transmitted by the mask and radiating to the surface of the workpiece the scanned light that is the marking pattern; and control means for causing the mask to display the divided pattern blocks, one after the other, and the second deflector to deflect the scanned light of the divided pattern blocks in corresponding divided directions so as to mark on the workpiece a combined pattern scanned by the first deflector and the second deflector.

The laser marking apparatus can comprise a first optical system for directing into a plurality of paths the laser light radiated by the laser oscillator, a plurality of masks disposed in the paths and adapted for displaying the same image at slightly different positions so as to fill the gaps between mask dots with the same image, a first deflector disposed between the first optical system and the masks, a second optical system for combining light transmitted by the masks, a second deflector disposed downstream of the second optical system, and control means for marking on the workpiece a combined pattern scanned by the first deflector and the second deflector.

The mask(s) for use in the laser marking apparatus is (are) a transmission type liquid crystal mask(s).

According to the above-mentioned laser marking system, the production management host computer can individually control each unit, the installation plate of the conveying apparatus, the loader and the unloader, which loads and unloads workpieces corresponding to the required operation and the operation time. As the marking apparatus marks workpieces at high speed, the workpieces can be correspondingly loaded and unloaded. Thus, the operation timing of the entire system can be optimally designated so as to mark a large number of workpieces in a short time.

According to the above-mentioned laser marking apparatus, the divided pattern blocks, into which a marking pattern is divided corresponding to, for example, the X direction, are displayed and scanned on the mask, block by block. In this construction, since the first deflector scans the blocks only in one direction, the first deflector can be constructed of for example only a polygon mirror. The light transmitted by the mask is radiated to the workpiece surface by the second deflector. The X direction of the deflecting position on the workpiece surface by the second deflector is fixed, whereas the Y direction thereof is moved by a divided pitch when each divided pattern block has been scanned. Thus, the input light to the mask is scanned in the X direction and the output light is scanned in the Y direction. By combining the divided pattern blocks, the original pattern can be marked on each workpiece. Therefore, since the apparatus does not need to raster scan the laser light onto the mask, the number of control items can be reduced, thereby improving control characteristics.

When each divided pattern block is displayed on a plurality of masks, the same block is displayed at different positions so as to fill the gaps between mask dots with the same block. In addition, the laser light is divided and scanned onto each mask, and the transmitted light is combined in one direction. The combined light is transmitted to the second deflector and the combined pattern is marked on the workpiece. Thus, the positional accuracy of marking, which depends on the pitch of the mask dots, can be improved.

A second aspect of the present invention is a laser marking method for raster scanning laser light radiated from a laser oscillator by a first deflector onto a mask surface, radiating light transmitted by the mask surface to the surface of a workpiece by a second deflector, loading an unmarked workpiece, and unloading a marked workpiece, the method comprising the steps of (1) clamping a workpiece on a feeder table of a feeder positioning unit disposed at an irradiation marking position, moving the feeder table and marking the workpiece, unclamping the workpiece from the feeder table, and moving the feeder table to an original position, (2) moving a supply table of a feeder supply unit from a supply table original position to a loader, receiving a workpiece from the loader, clamping the workpiece on the supply table, moving the supply table to the feeder positioning unit, unclamping the workpiece from the supply table, supplying the workpiece to the feeder positioning unit, and moving the feeder table to the feeder table original position, and (3) moving a discharge table of a discharge unit from a discharge table original position to the feeder positioning unit, receiving a workpiece from the feeder positioning unit, clamping the workpiece on the feeder discharge table, moving the feeder discharge table to an unloader, unclamping the workpiece from the feeder discharge table, unloading the workpiece, and moving the feeder discharge table to the feeder table original position, wherein the steps (1) to (3) are totally controlled by a controller that is adapted to receive and transmit signals from and to a production management host computer through a communication line.

The step (1) can be performed by displaying each divided pattern block equivalent to a scanning line, block by block, on the mask by the first deflector adapted for scanning in one direction the laser light radiated from the laser oscillator, deflecting the scanned light selectively transmitted by the mask and radiating the divided pattern block to the surface of the workpiece by the second deflector, controlling the second deflector so as to deflect the scanned light of the divided pattern block to a corresponding divided direction, and marking on the workpiece a combined pattern scanned by the first deflector and the second deflector.

The step (1) can be performed by dividing the laser light radiated from the laser oscillator into a plurality of laser paths by a first optical system, displaying the same marking pattern on a plurality of masks disposed in the laser paths so as to fill the gaps between mask dots with the same marking pattern, scanning the divided laser light onto the masks by the first deflector, combining light transmitted by the masks into a single beam by a second optical system, and marking the combined pattern on the workpiece.

According to the laser marking method, the same effects as the above-mentioned laser marking system can be obtained.

DESCRIPTION OF PREFERRED EMBODIMENTS

A first embodiment of the present invention will be described with reference to FIGS. 1 to 11.

Figure 2:
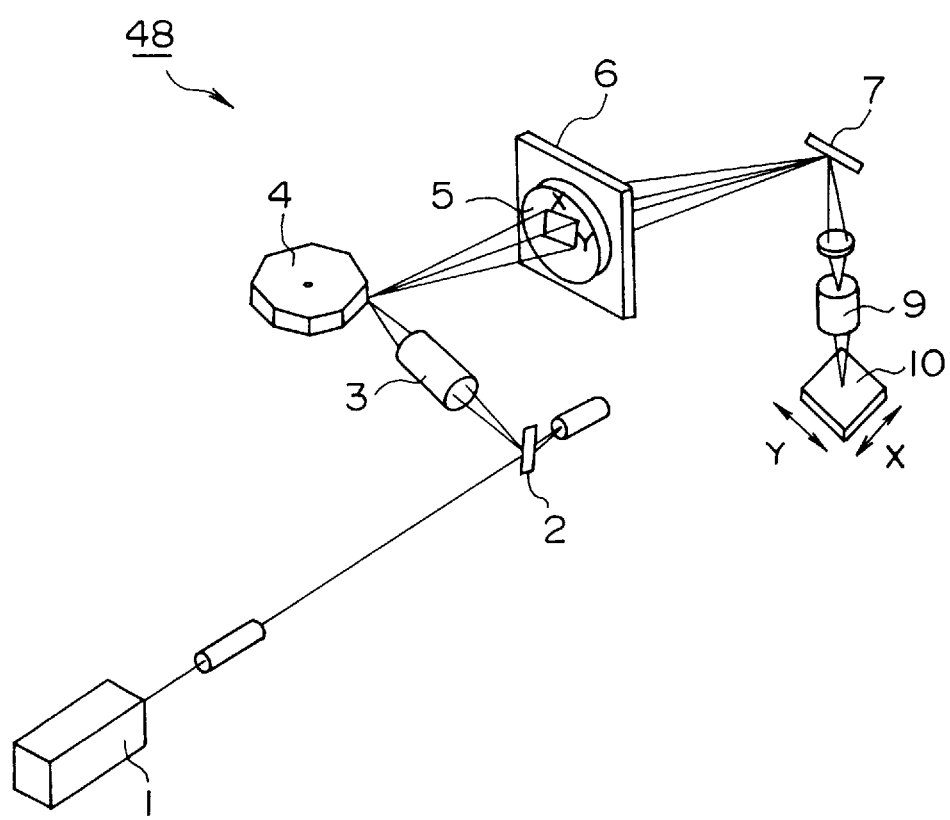
FIG. 2 is a schematic perspective view for explaining a laser marking apparatus.

Referring to FIG. 2, an example of a laser marking apparatus 48 according to the first embodiment of the present invention is shown. A laser light radiated from a YAG laser oscillator 1, which is a light source, is radiated onto an X direction deflecting mirror 2. The reflected light of the X direction deflecting mirror 2 is scanned by the X direction deflecting mirror 2 onto a marking surface 10 at a predetermined angle in the X direction. The reflected light is radiated to a polygon mirror 4 through a relay lens 3. As the polygon mirror 4 is rotated, the marking surface 10 is scanned in the Y direction, line by line. The laser light is converged to a desired size by a field lens 5. The converged light is transmitted to the marking surface 10 through a liquid crystal mask 6, a deflecting mirror 7, and a relay lens 9. Thus, the marking surface 10 is marked according to a pattern on the liquid crystal mask 6. divided pattern block.

Figure 1:
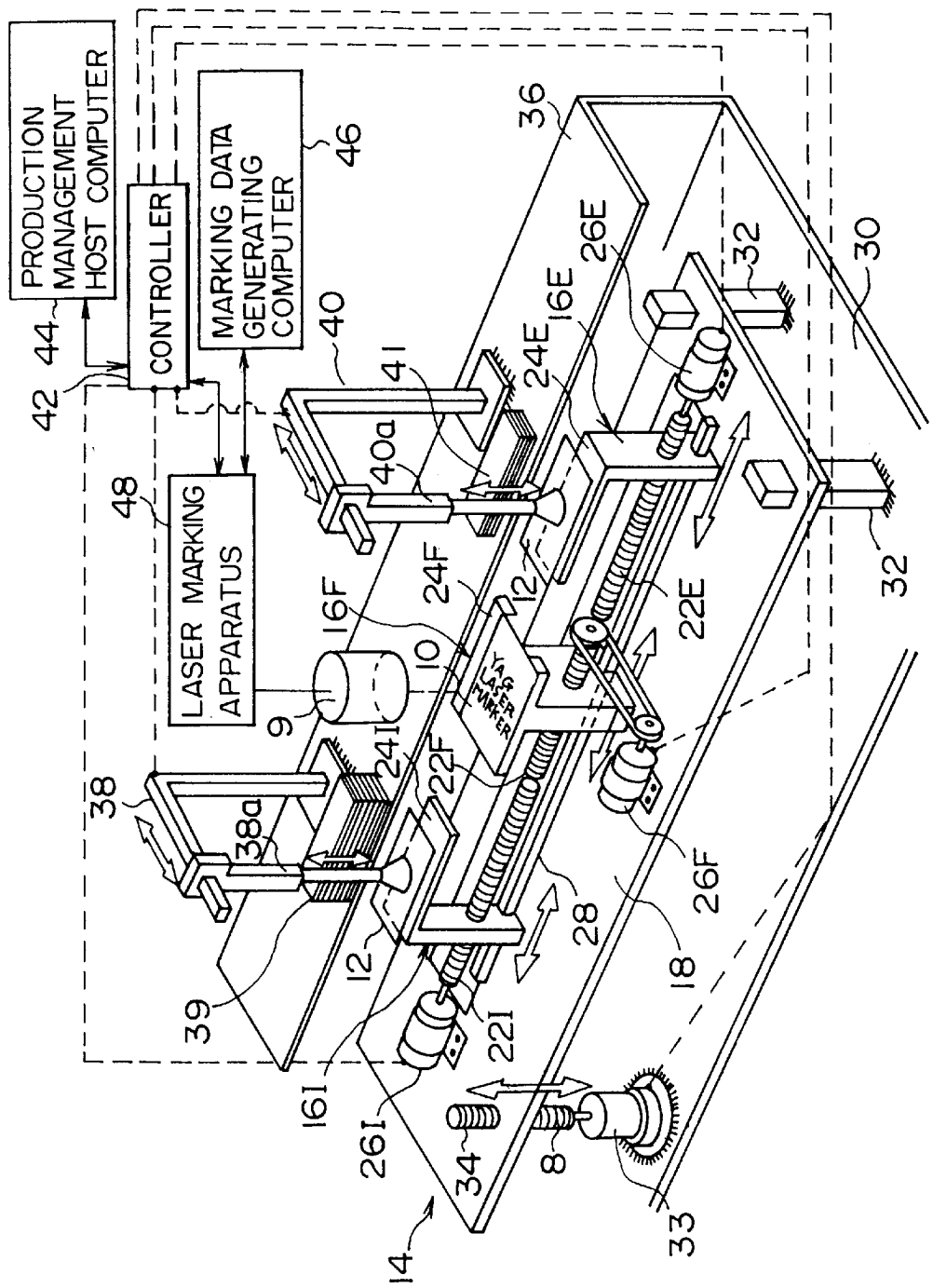
FIG. 1 is a perspective view showing a construction of a laser marking system according to a first embodiment of the present invention.

FIG. 1 is a schematic diagram showing an overall construction of a laser marking system with the above-mentioned laser masking apparatus 48. A workpiece 12 is conveyed by a conveying apparatus 14 so that the marking surface 10 is placed at a focus position of the relay lens 9 that is a laser emitting opening of the laser marking apparatus 48.

The conveying apparatus 14 comprises a feeder positioning unit 16F, a feeder supply unit 16I, and a feeder discharge unit 16E. The feeder positioning unit 16F is adapted to convey a workpiece 12 to a marking position disposed just below the relay lens 9. The feeder supply unit 16I is disposed upstream of the feeder positioning unit 16F. The feeder discharge unit 16E is disposed downstream of the feeder positioning unit 16F and is adapted to convey away from the feeder positioning unit 16F a workpiece 12 that has been marked. These units 16F, 16I, and 16E are disposed on an installation plate 18. The feeder positioning unit 16F has a screw shaft 22F and a feeder table 24F. The feeder supply unit 16I has a screw 22I and a supply table 24I. The feeder discharge unit 16E has a screw shaft 22E and a discharge table 24E. The screw shafts 22F, 22I, and 22E are coaxially aligned in the conveying direction of a workpiece. The feeder table 24F, the supply table 24I, and the discharge table 24E are threaded to the screw shafts 22F, 22I, and 22E, respectively. The feeder table 24F, the supply table 24I, and the discharge table 24E are coaxially moved. Rotation drive motors 26F, 26I, and 26E are mounted to the screw shafts 22F, 22I, and 22E, respectively. A guide rail 28 is disposed in parallel with the screw shafts 22F, 22I, and 22E and is adapted to guide the tables 24F, 24I, and 24E, which move therealong. The guide rail 28 passes through the tables 24F, 24I, and 24E so as to guide them. The feeder table 24F defines a cavity portion at a center position thereof so as to support both lateral edge portions of a workpiece 12. Each of the supply table 24I and the discharge table 24E fit within the cavity portion of the feeder table 24F so as to supply and remove a workpiece 12 to and from the feeder table 24F. When the tables 24F, 24I, and 24E are stopped, they transfer a workpiece 12 from one to another. In other words, the workpiece 12 is placed on the supply table 24I at the feeder supply unit 16I. The workpiece 12 is then transferred to the feeder positioning unit 16F and placed on the feeder table 24F. After the workpiece 12 is marked, it is placed on the discharge table 24E at the feeder discharge unit 16E and conveyed to the downstream end of the conveying line 14.

The installation plate 18, on which the conveying apparatus 14 is disposed, has a focal point adjusting mechanism 8 that allows a workpiece 12 to be positioned at the focal point of the relay lens 9. In other words, a base plate 30 is disposed below the installation plate 18, and the installation plate 18 is raised and lowered with respect to the base plate 30. The installation plate 18 is moved by a lifting drive motor 33 and a lifting screw 34. The lifting drive motor 33 is mounted on the base plate 30. The lifting screw 34 is threadedly engaged with the installation plate 18. It should be appreciated that the lifting drive operation of the installation plate 18 can be performed by a hydraulic cylinder. With the lifting drive operation, even if the thickness of the workpieces varies, the focal position can be adjusted.

The base plate 30 is integral with a stock table 36 that is disposed along the units 16I, 16F, and 16E. A loader 38 is disposed perpendicular to the feeder supply unit 16I. The loader 38 supplies an unmarked workpiece 12 to the supply table 24I. An unloader 40 is disposed perpendicular to the feeder discharge unit 16E. The unloader 40 receives from the discharge table 24E a marked workpiece 12. The loader 38 has a vacuum cup means that sucks, lifts up, and conveys a workpiece 12 from the stock table 36 to the feeder supply unit 16I. The unloader 40 has a vacuum cup means that sucks, lifts up, and conveys a workpiece 12 from the feeder discharge unit 16E to the stock table 36.

The laser marking system further comprises a controller 42, a production management host computer (hereinafter referred to as the host computer) 44, and a marking data generating computer (hereinafter referred to as the computer) 46. The controller 42 integrally controls the conveying apparatus 14, the installation plate 18, the loader 38, the unloader 40, and the laser marking apparatus 48. The host computer 44 controls the marking objects and the quantity of workpieces in the marking process. Data is transmitted and received among these apparatuses and units through a communication line.

Data flow paths between the host computer 44 and the conveying apparatus 14 are as follows. The host computer 44 transmits to the conveying apparatus 14 data with respect to a workpiece 12 to be marked. The data includes a marking object, the number of times of marking operation, and the size of each workpiece. The controller 42 controls and drives the units 16I, 16F, and 16E of the conveying apparatus 14 and the individual constructional elements of the loader 38 and the unloader 40, and so forth.

Data flow paths between the conveying apparatus 14 and the laser marking apparatus 48 are as follows. Each workpiece is marked corresponding to a marking request signal, a marking data change request signal, a request data identification number (these signals flow from the conveying apparatus 14 to the laser marking apparatus 48), a workpiece conveying request signal (this signal flows from the laser marking apparatus 48 to the conveying apparatus 14), and an error occurrence informing signal (this signal flows between the conveying apparatus 14 and the laser marking apparatus 48).

The computer 46 of the laser marking apparatus 48 has a memory that stores a plurality of marking data that include the marking objects and their positions, and the status settings of the laser marking apparatus 48. The marking data have been created by an operator. When the host computer 44 requests marking data through the laser marking apparatus 48, the computer 46 outputs the requested marking data.

The controller 42 controls the individual constructional elements of the conveying apparatus 14, in particular, the loader 38, the feeder supply unit 16I, the feeder positioning unit 16F, the feeder discharge unit 16E, and the unloader 40.

Figure 3:
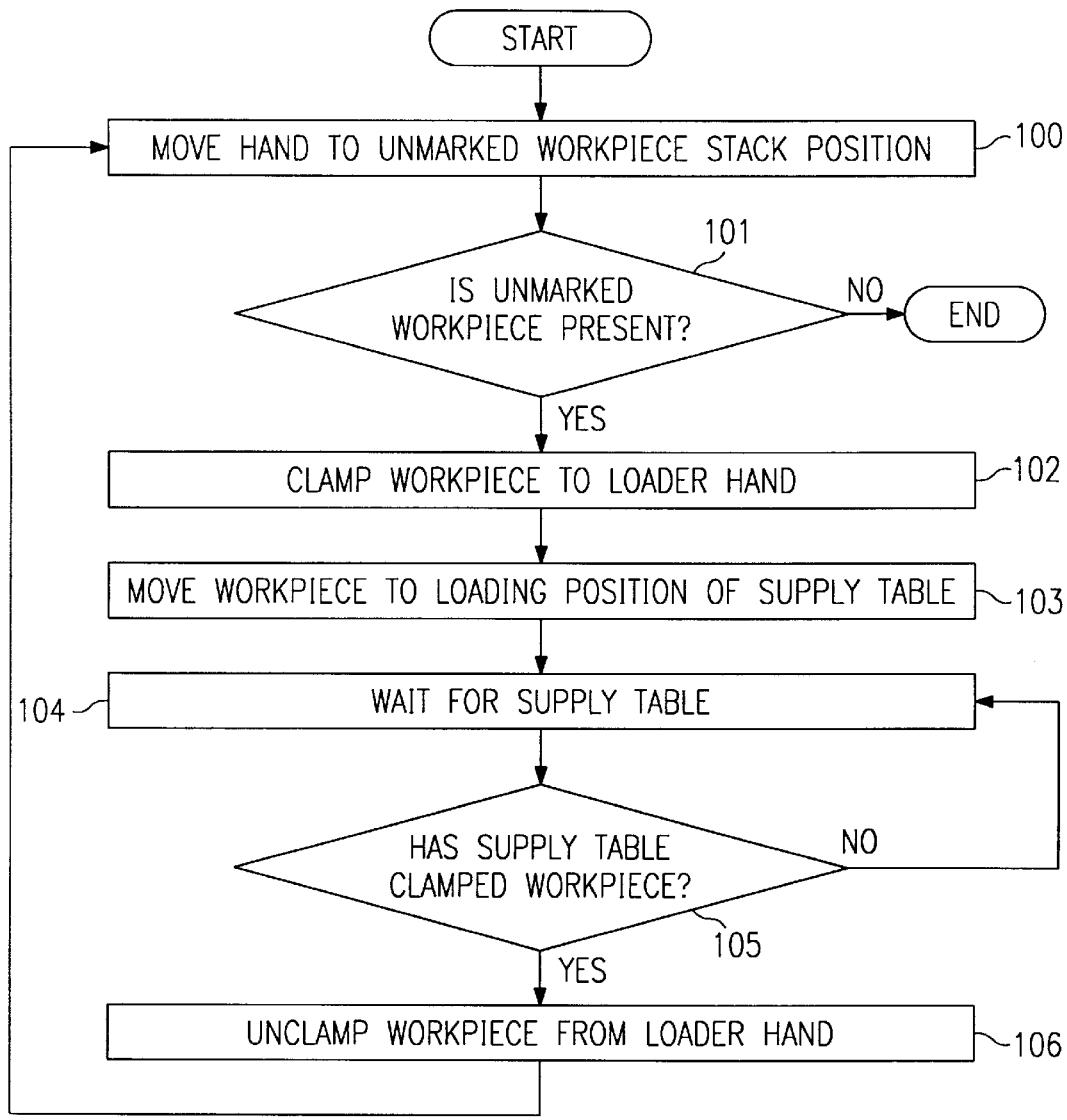
FIG. 3 is a flow chart showing a process of a loader.

As shown in FIG. 3, the loader 38 has a hand 38a with a vacuum cup, which moves to an unmarked workpiece in the stack location 39 (at step 100). With a sensor (not shown), the host computer 44 determines whether or not a workpiece 12 is present at the stack location 39 (at step 101). When no workpiece 12 is present at the stack location 39, the host computer 44 terminates the loading operation. When there is a workpiece 12 at the stack location 39, the hand 38a sucks and clamps the workpiece 12 (at step 102). Next, the hand 38a moves to an upper clamping position of the feeder supply unit 16I (at step 103). The host computer 44 causes the hand 38a to stop until the supply table 24I arrives at the clamping position (at step 104). When the supply table 24I starts to move, the host computer 44 causes the workpiece 12 to be positioned on the feeder supply unit 16I for the transfer of the workpiece 12 to the supply table 24I. After having determined that the workpiece 12 has been clamped to the supply table 24I (at step 105), the host computer 44 unclamps the workpiece 12 from the loader 38 (at step 106). The host computer 44 repeats these steps for each of the remaining unmarked workpieces 12.

Figure 4:
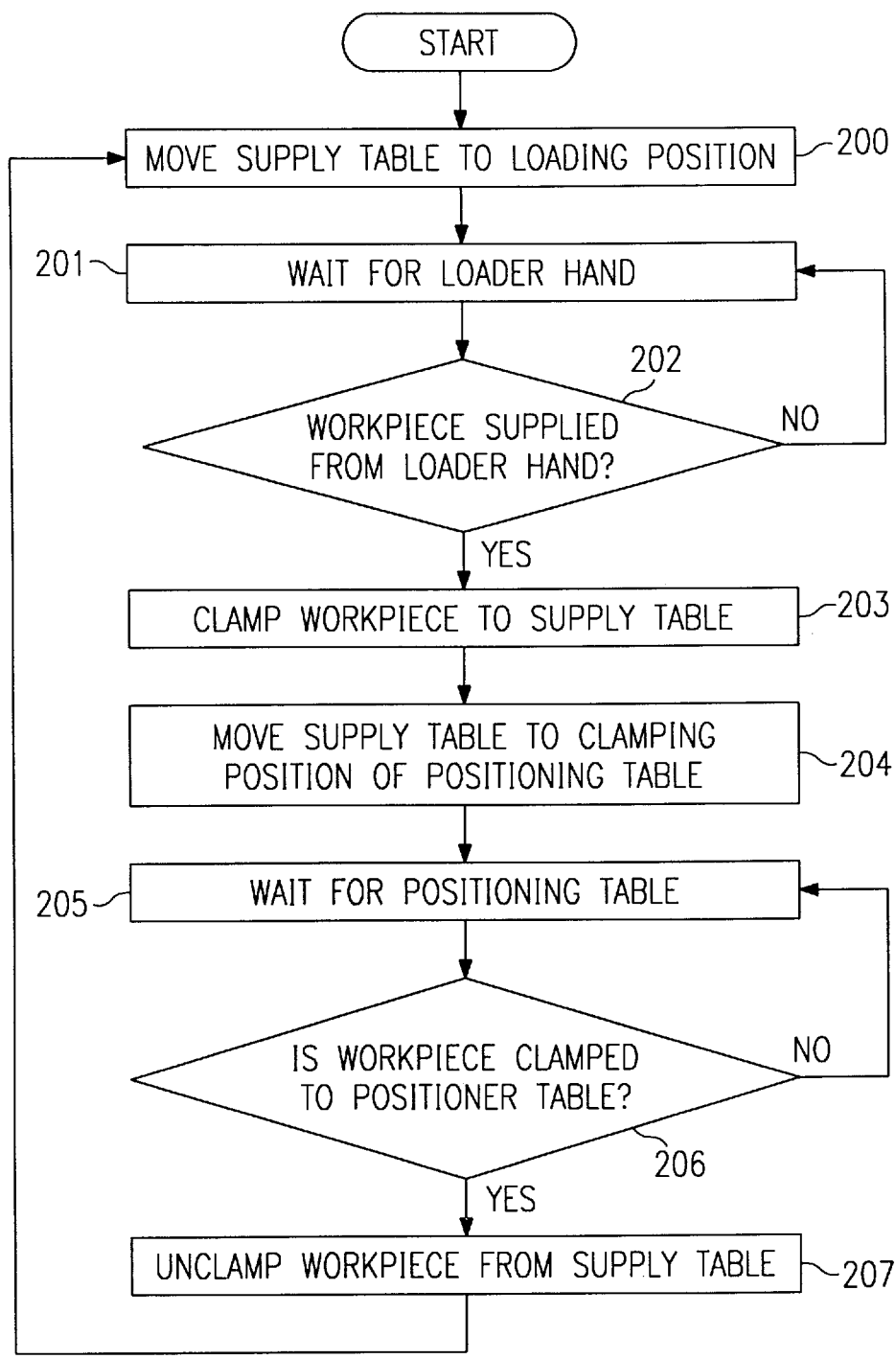
FIG. 4 is a flow chart showing a process of a feeder supply unit.

As shown in FIG. 4, the feeder supply unit 16I moves the supply table 24I to the workpiece receiving position of the loader 38 (at step 200). The feeder supply unit 16I waits until the host computer has determined that a workpiece 12 has been supplied from the loader 38 (at step 201). When the workpiece 12 has been supplied from the loader 38 (at step 201), the feeder supply unit 16I clamps the workpiece 12 to the supply table 24I (at steps 202 and 203). Then the supply table 24I moves toward the feeder positioning unit 16F (at step 204). The supply table 24I stops at a workpiece transfer position of the feeder table 24F (at step 205). The host computer 44 determines whether or not the workpiece 12 has been clamped on the feeder table 24F (at step 206). After performing the clamping operation, the feeder supply unit 16I unclamps the workpiece 12 from the supply table 24I (at step 207). The feeder supply unit 16I repeats these steps beginning with step 200.

Figure 5:
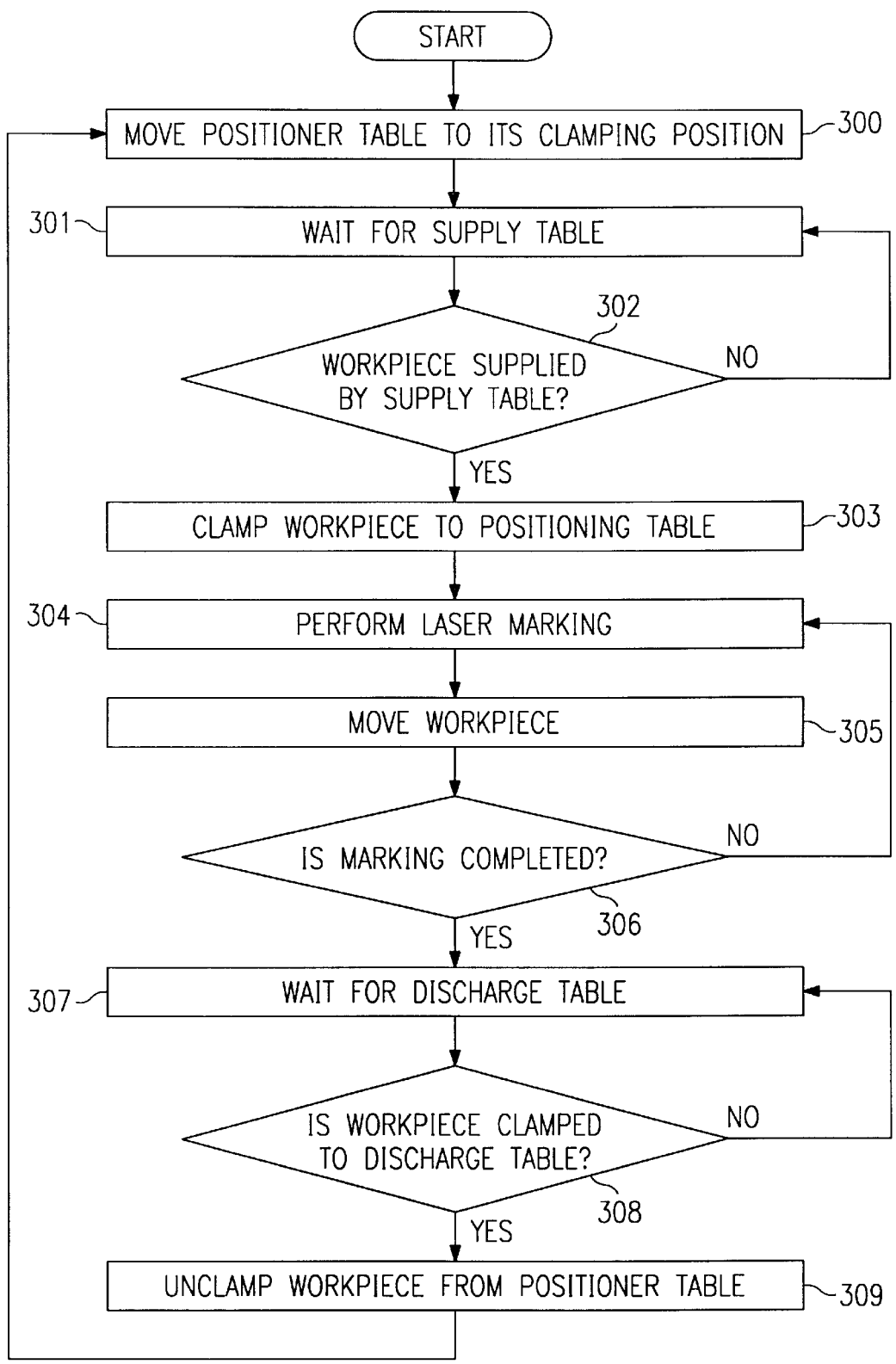
FIG. 5 is a flow chart showing a process of a feeder positioning unit.

As shown in FIG. 5, the feeder positioning unit 16F moves the feeder table 24F to a workpiece receiving position (at step 300). The feeder positioning unit 16F waits until a workpiece 12 is supplied from the feeder supply unit 16I (at step 301). When the host computer 44 has determined that the workpiece 12 has been transferred to the feeder table 24F (at step 302), the feeder positioning unit 16F clamps the workpiece 12 on the feeder table 24F (at step 303). The host computer 44 drives the laser marking apparatus 48, which marks the workpiece 12 (at step 303). While varying the marking position of the workpiece 12, the host computer 44 causes the laser marking apparatus 48 to mark the entire pattern on the workpiece 12 (at step 305). After the laser marking apparatus 48 has marked the pattern on the workpiece 12 (at step 306), the feeder positioning unit 16F waits until the discharge table 24E arrives at a workpiece receiving position (at step 307). The host computer determines whether or not the discharge table 24E has been positioned below the feeder table 24F and the workpiece 12 has been clamped to the discharge table 24E (at step 308). After the workpiece 12 has been clamped to the discharge table 24F, the feeder positioning unit 16F unclamps the workpiece 12 from the feeder table 24F. Thus, the workpiece 12 has been transferred to the discharge table 24F (at step 309). The feeder positioning unit 16F repeats these steps beginning with step 300 so as to wait until the next workpiece 12 is supplied.

Figure 6:
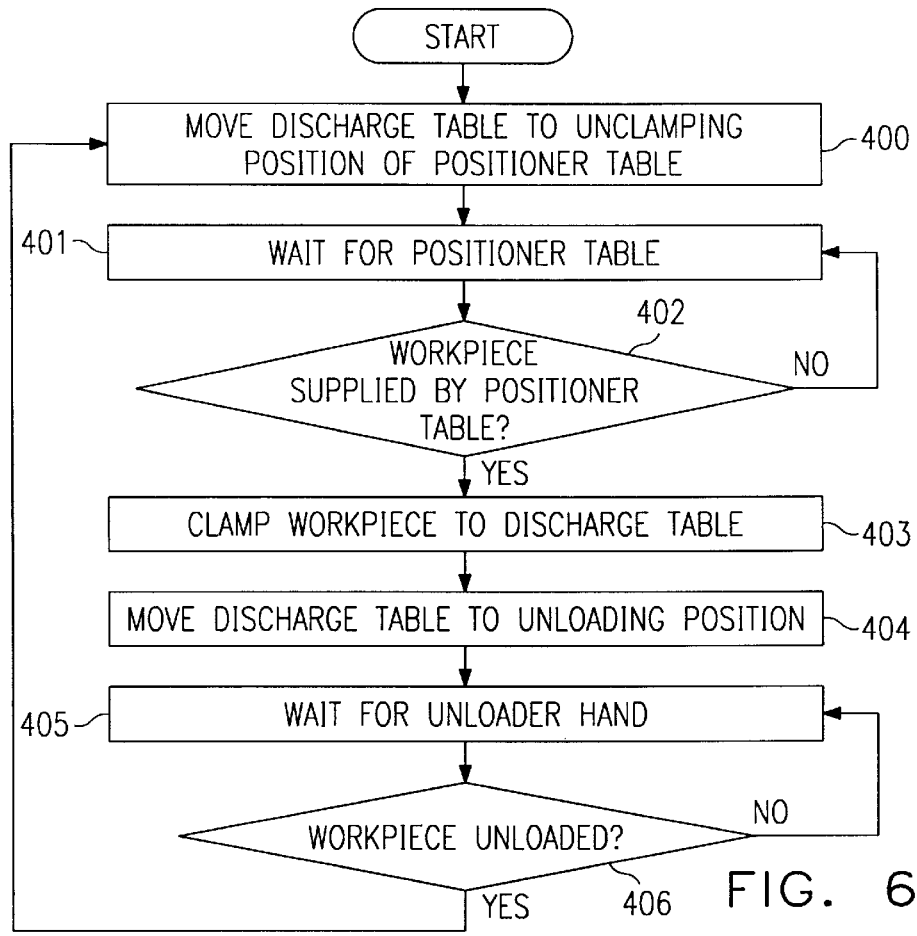
FIG. 6 is a flow chart showing a process of a feeder discharge unit.

As shown in FIG. 6, the feeder discharge unit 16E moves the discharge table 24E to a workpiece receiving position (at step 400) and waits until the workpiece 12 is transferred (at step 401). When the workpiece 12 is transferred from the feeder table 24F, the feeder discharge unit 16E clamps the workpiece 12 to the discharge table 24E (at steps 402 and 403). The discharge table 24E moves in the downward direction and stops at an unload position (at steps 404 and 405). The host computer 44 determines whether or not the unloader 40 has unloaded the workpiece 12 (at step 406). When the unloader 40 has not unloaded the workpiece 12, the discharge table 24E remains stopped. When the unloader 40 has unloaded the workpiece 12, the feeder discharge unit 16E repeats these steps beginning with step 400.

Figure 7:
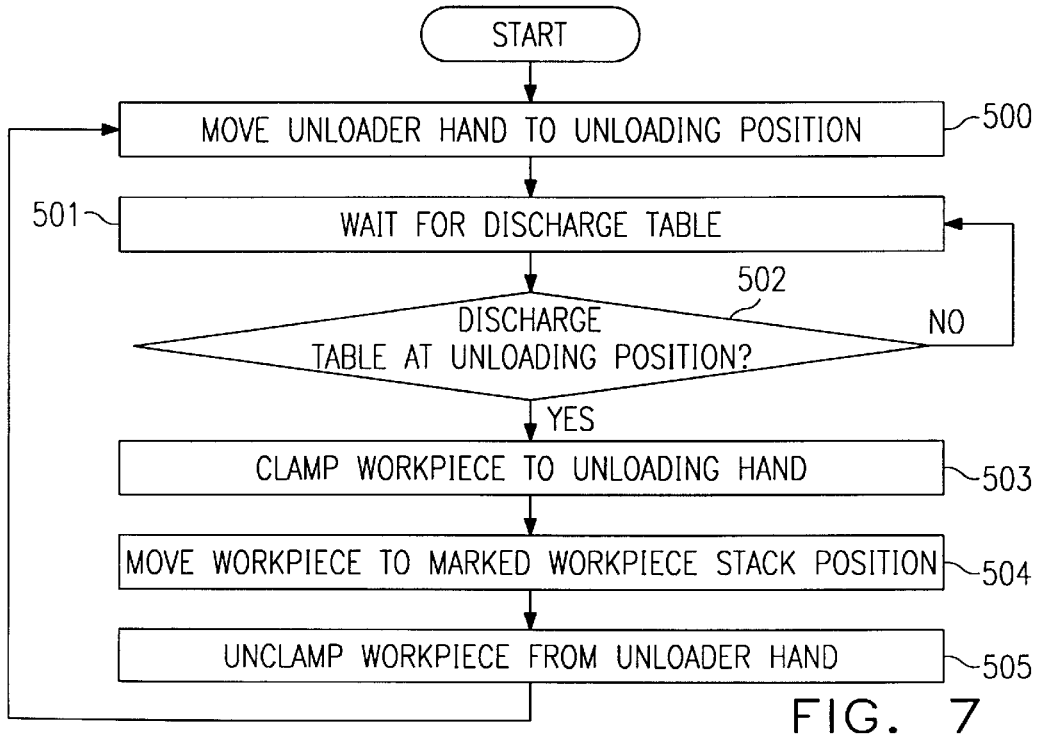
FIG. 7 is a flow chart showing a process of an unloader.

As shown in FIG. 7, the unloader 40 moves a hand 40a with a vacuum cup to a marked workpiece unload position of the discharge table 24E and waits (at steps 500 and 501). The host computer 44 determines whether or not the discharge table 24E has arrived at the workpiece unload position (at step 502). When the discharge table 24E has arrived at the workpiece unload position, the unloader 40 lowers the hand 40a so as to suck and clamp the workpiece 12 (at step 503). The hand 40a moves upwardly and laterally to a marked workpiece stack position 41 (at step 504). The hand 40a unclamps the workpiece 12 (at step 505). The unloader 40 repeats these steps.

Figure 8:
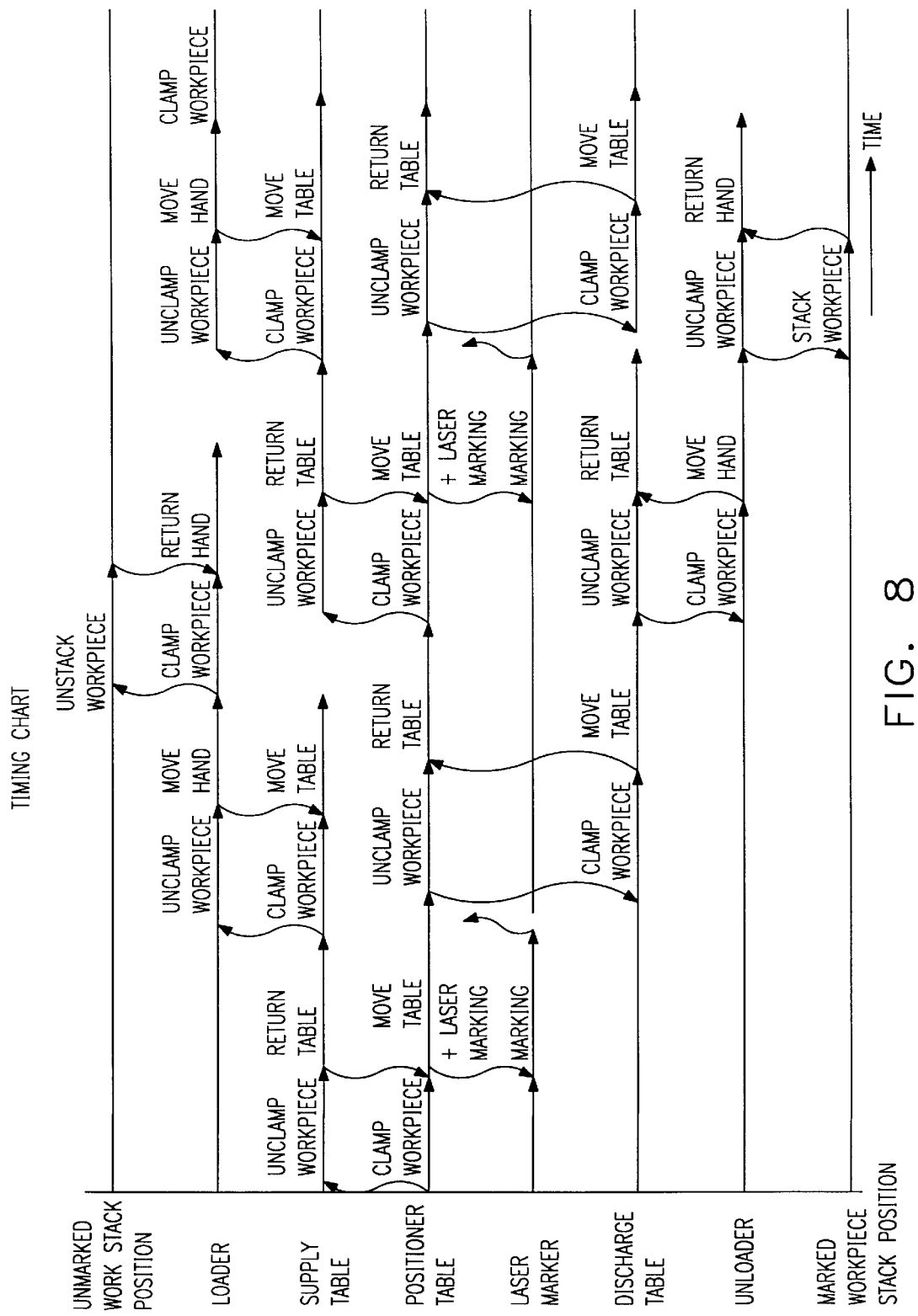
FIG. 8 is a timing chart showing an operation of the marking system according to the first embodiment.

The above-described operations of the conveying apparatus 14 and the laser marking apparatus 48 are controlled by the host computer 44 corresponding to a timing chart shown in FIG. 8. To improve marking efficiency per hour, the feeder positioning unit 16F, which directly contributes to marking workpieces 12, should always perform at least required marking operations.

The feeder positioning unit 16F fastens an unmarked workpiece 12 to the feeder table 24F, moves the feeder table 24F, marks the workpiece 12, unclamps the marked workpiece 12, and returns the feeder table 24F to the workpiece clamping position. The feeder positioning unit 16F repeats these steps.

While the feeder positioning unit 16F is operating for the marking operation, the table returning operation, or the like, the feeder supply unit 16I receives an unmarked workpiece 12 from the loader 38, fastens the workpiece 12 to the supply table 24I, moves the supply table 24I to the workpiece transfer position of the feeder positioning unit 16F, and waits until the feeder positioning unit 16F arrives at the workpiece transfer position. When the feeder positioning unit 16F requests a workpiece 12, the feeder supply unit 16I transfers the workpiece 12 to the feeder positioning unit 16F. Then the feeder supply unit 16I returns the supply table 24I to the loader position.

When the feeder supply unit 16I requests a workpiece 12, the loader 38 transfers the workpiece 12 to the supply table 24I of the feeder supply unit 16I. The hand 38a with the vacuum cup moves to the unmarked workpiece stack location 39 and picks up the next workpiece 12. Then, the hand 38a moves to the transfer position of the feeder supply unit 16I and waits.

The feeder discharge unit 16E waits at a marking end position of the feeder positioning unit 16F until a workpiece 12 has been marked. When the feeder positioning unit 16F requests the workpiece 12, the feeder discharge unit 16E receives the marked workpiece 12 from the feeder positioning unit 16F. The feeder discharge unit 16E moves the discharge table 24E to the unload position. After unclamping the workpiece 12, the feeder discharge unit 16E moves the discharge table 24E to the marking end position of the feeder positioning unit 16F.

When the feeder discharge unit 16E requests the unloader 40 to unload the workpiece 12, the unloader 40 picks up the workpiece 12 on the discharge table 24E. The unloader 40 moves the hand 40a with the vacuum cup so as to pile the workpiece 12 on the marked workpiece stack position 41. The unloader 40 moves the hand 40a to the workpiece transfer position of the feeder discharge unit 16E and waits for the next workpiece 12.

Next, with reference to FIGS. 9 to 11, operations of these units will be described.

Figure 9:
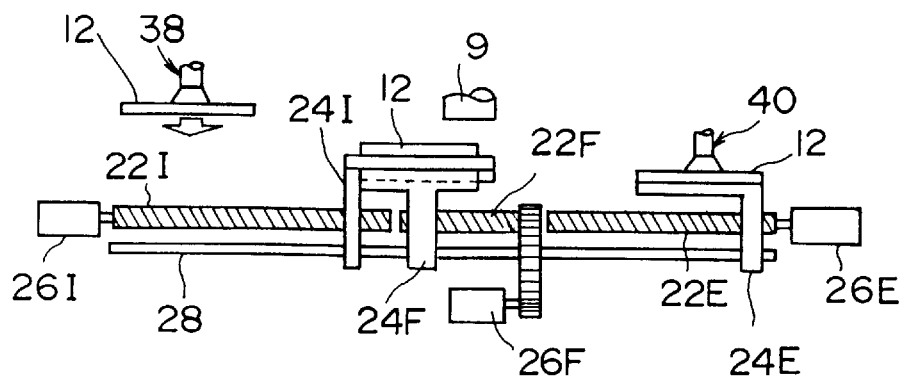
FIG. 9 is a schematic view for explaining a workpiece receiving operation of the feeder positioning unit.

FIG. 9 shows operations of individual units where a workpiece 12 is being transferred from the supply table 24I to the feeder table 24F. The loader 38 prepares the next workpiece 12 to be conveyed. The discharge table 24E is transferring a marked workpiece 12 to the unloader 40.

Figure 10:
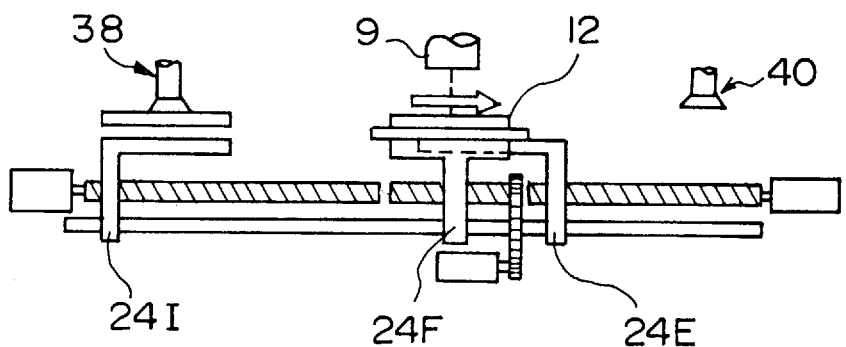
FIG. 10 is a schematic view for explaining workpiece marking operation.

FIG. 10 shows operations of individual units where a workpiece 12 is being marked on the feeder table 24F. The loader 38 is loading the next workpiece 12 on the supply table 24I. The unloader 40 waits until the workpiece 12 is marked.

Figure 11:
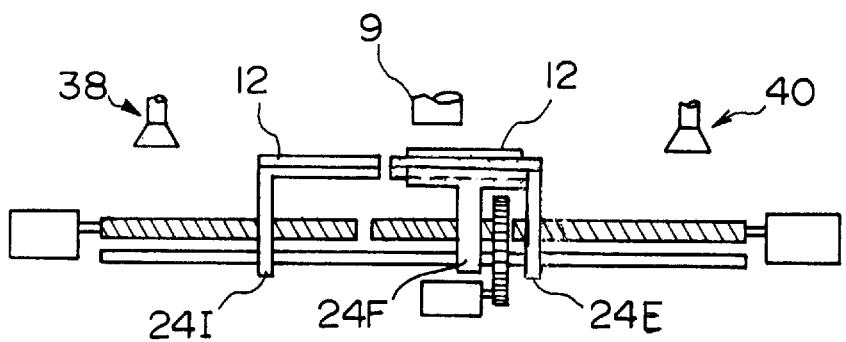
FIG. 11 is a schematic view for explaining a workpiece discharge operation.

FIG. 11 shows operations of individual units where a marked workpiece 12 is being transferred from the feeder table 24F to the discharge table 24E. The supply table 24I waits for the feeder table 24F so as to transfer the next workpiece 12.

The operating range of each unit is designated by the controller 42 corresponding to the size of workpieces and marking objects that are received from the host computer 44. To designate a focal position corresponding to the thickness of each workpiece, the lifting amount of the installation plate 18 is adjusted by the focal point adjusting mechanism 33. Thus, the height of the installation plate 18 is designated.

Figure 12:
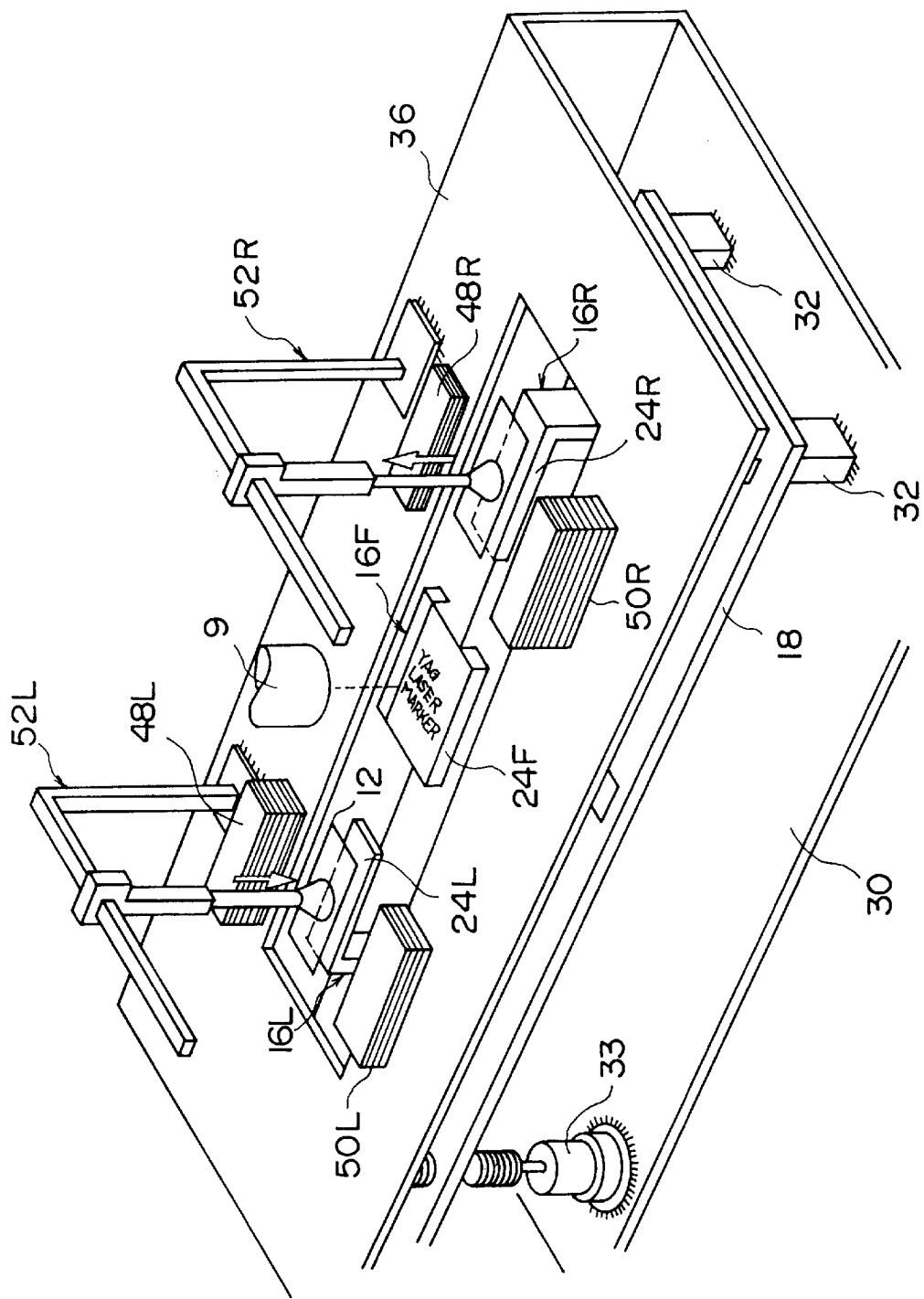
FIG. 12 is a perspective view showing a marking system according to a second embodiment of the present invention.

Next, with reference to FIG. 12, a laser marking system according to a second embodiment of the present invention will be described.

The construction of the second embodiment is basically the same as that of the first embodiment. Two units are opposed with the feeder positioning unit 16F therebetween. These units each perform a supplying operation and a discharging operation. In other words, a first feeder supply and discharge unit 16L is movably disposed on the left of the feeder positioning unit 16F. An unmarked workpiece stack position 48L and a marked workpiece stack position 50L are opposed with a moving table 24L of the first feeder supply and discharge unit 16L therebetween. A first loader and unloader 52L is disposed outside the unmarked workpiece stack position 48L. Likewise, a second feeder supply and discharge unit 16R is movably disposed on the right of the feeder positioning unit 16F. An unmarked workpiece stack position 48R and a marked workpiece stack position 50R are opposed with a moving table 24R of the second feeder supply and discharge unit 16R therebetween. A second loader and unloader 52R is disposed outside the unmarked workpiece stack position 48R.

The feeder positioning unit 16F receives a workpiece 12 from the first feeder supply and discharge unit 16L. After the workpiece 12 has been marked, the feeder positioning unit 16F transfers the marker workpiece 12 to the second feeder supply and discharge unit 16R.

The feeder positioning unit 16F receives a new workpiece 12 from the second feeder supply and discharge unit 16R. After the new workpiece 12 has been marked, the feeder positioning unit 16F transfers the marked workpiece 12 to the first feeder supply and discharge unit 16L. According to the second embodiment, a large number of workpieces 12 can be effectively marked.

Next, with reference to FIGS. 13 to 17, a third embodiment of the present invention will be described.

Figure 13:
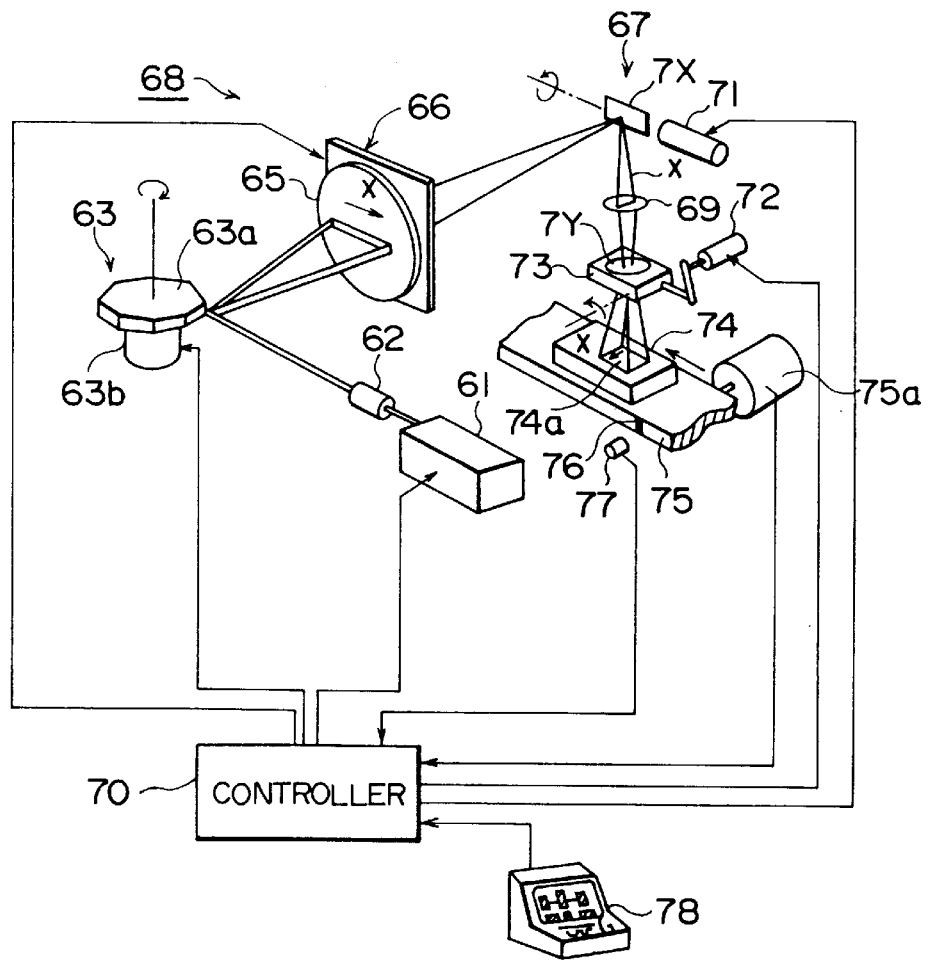
FIG. 13 is a schematic diagram showing a construction of a laser marking apparatus according to a third embodiment of the present invention.

As shown in FIG. 13, a laser marking apparatus 68 according to the third embodiment comprises a YAG laser oscillator 61, an optical lens 62, and a first deflector 63. The YAG laser oscillator 61 is a laser light source. The optical lens 62 converges the laser light. The first deflector 63 deflects and scans the converged laser light only in the X direction. The first deflector 63 is a 36-sided polygon mirror 63a. The polygon mirror 63a has several constant speed modes that can be selected, workpiece by workpiece. In other words, each side of the polygon mirror 63 is equivalent to each line in the X direction of a liquid crystal mask 66, which will be described later. Each turn of the polygon mirror 63 allows the divided blocks, which are 36 lines in the X direction, to be scanned.

The liquid crystal mask 66 receives laser light scanned by the first deflector 63 through a field lens 65 and displays any pattern that electrically transmits or scatters the laser light so as to form a desired mark pattern. The liquid crystal mask 66 is referred to as a polymer compound liquid crystal mask. An example of the liquid crystal mask 66 is liquid crystal compound composed of liquid crystal and resin (as disclosed in Japanese Patent Laid-Open Publication No. 2-96714). The liquid crystal mask 66 has a large number of parallel electrode lines on the front and rear surfaces thereof. The parallel electrode lines on the front surface are perpendicular to the parallel electrode lines on the rear surface. When a voltage is applied to a portion of the liquid crystal, this portion transmits laser light. Otherwise, the liquid crystal scatters laser light. A liquid crystal that switches between a light transmitting state and a non-light transmitting state can be employed in an apparatus according to the present invention. An example of this liquid crystal is a TN type liquid crystal. With this liquid crystal, when voltages are selectively applied to the parallel electrode lines, a corresponding pattern can be quickly displayed. The liquid crystal mask 66, which is composed of polymer compound liquid crystal, does not need a deflecting plate. In addition, the intensity of laser light that is transmitted by the liquid crystal mask 66 is at least twice that of a conventional liquid crystal mask. In this embodiment, the liquid crystal mask 66 displays each divided pattern with a line-shaped dot matrix formed of 8 vertical dots×256 horizontal dots. The liquid crystal mask 66 is not limited to this type. Instead, various types such as a liquid crystal mask with a dot matrix formed of 16 dots×512 dots may be used.

Figure 14:
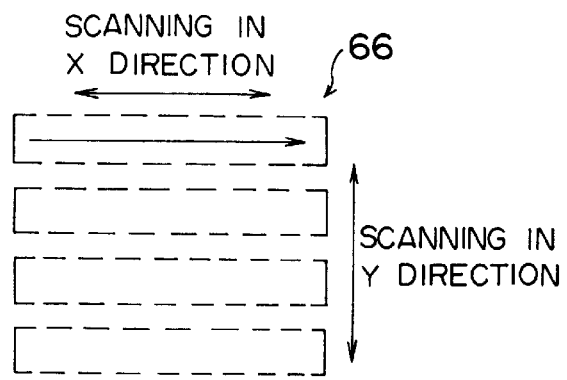
FIG. 14 is a schematic diagram for explaining a liquid crystal mask display pattern scanned by a first deflector.
Figure 17:
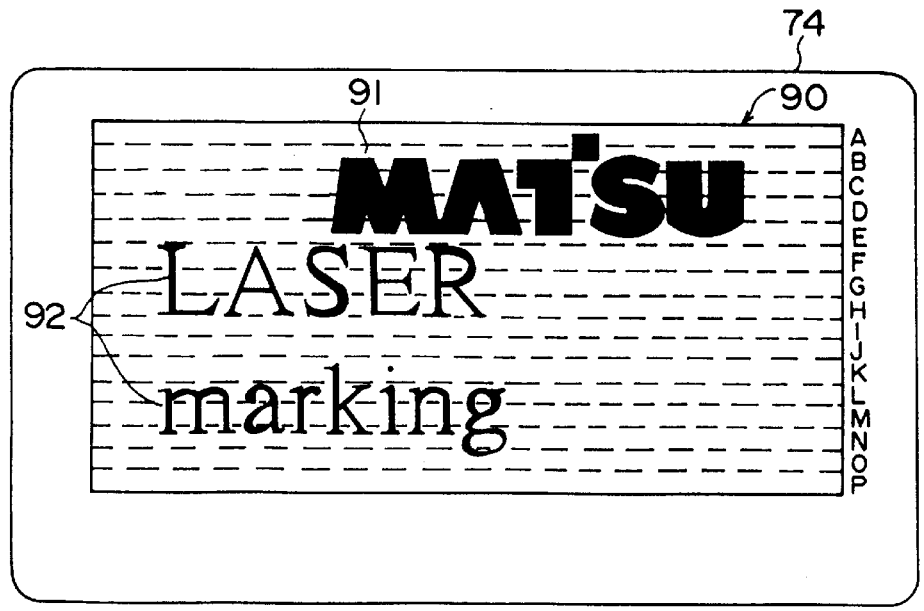
FIG. 17 is a schematic diagram for explaining a marking pattern and divided pattern blocks.

The liquid crystal mask 66 displays a pattern to be marked with divided pattern blocks. As shown in FIG. 14, the width of each divided pattern block is equivalent to the width of one scanning line scanned by the first deflector 63. The pattern to be displayed on the liquid crystal mask 66 is controlled by a controller 70. As shown in FIG. 17, an entire pattern 90 composed of a FIG. 91 and letters 92 has been stored as print information composed of 256 horizontal dots×128 vertical dots in the main memory of the controller 70. With respect to the print information, "1" and "0" represent a print portion and a non-print portion, respectively. The entire pattern 90 is divided into 16 horizontal blocks. Thereby, 16 line-shaped pattern A second deflector 67 is disposed on the output side of the liquid crystal mask 66. The second deflector 67 deflects laser light transmitted by the liquid crystal mask 66, corresponding to the pattern formed thereon, toward the surface of the workpiece 74. The second deflector 67 comprises an X direction deflector 7X and a Y direction deflector 7Y. The X direction deflector 7X is constructed of a mirror that directly reflects laser light transmitted by the liquid crystal mask 66. The Y direction deflector 7Y is constructed of a lens that deflects laser light deflected by the X direction deflector 7X in the Y direction. The orientation of the second deflector 67 is not changed from a marking region of a divided pattern block until the block has been scanned on the liquid crystal mask 66. When the divided pattern block has been scanned, the second deflector 67 is moved to the marking region of the next divided pattern block. Likewise, the orientation of the second deflector 67 is not changed from the marking region of this divided pattern block until this pattern block has been scanned.

The X direction deflector 7X has a drive motor 71 that aligns the reflected light in the X direction. The Y direction deflector 7Y has driving means 72 and 73 that move the Y direction deflector 7Y along the marking surface 74a of the workpiece 74. The first drive means 72 is a motor that is driven by an operation timing command of the controller 70. The second drive means 73 is a horizontal moving table. These drive means 72 and 73 are connected through a link mechanism that is connected to an output shaft of the motor 72. The motor 72 moves the horizontal moving table 73 in the Y direction. In this embodiment, an objective lens 69 is disposed between the X direction deflector 7X and the Y direction deflector 7Y. Since the objective lens 69 is independent from the Y direction deflector 7Y, the size of the lens system of the second deflector 67 is decreased. In addition, this objective lens 69 prevents the marking from dislocating and the density of radiated laser light from decreasing.

CW oscillation of the YAG laser oscillator 61 is controlled by a Q switch. The Q switch employs acoustic and optical effects. The Q switch can decrease the oscillation intensity of the laser light so that the oscillation intensity is lower than the minimum value of laser energy that can mark a workpiece.

A light converging optical system of the first deflector 63 is constructed of a collimator lens 62 disposed between the laser oscillator 61 and the polygon mirror 63. When the beam diameter of the laser light radiated from the laser oscillator 61 is large, the collimator lens 62 converges the laser light so as to increase the energy density of the output beam.

Figure 15:
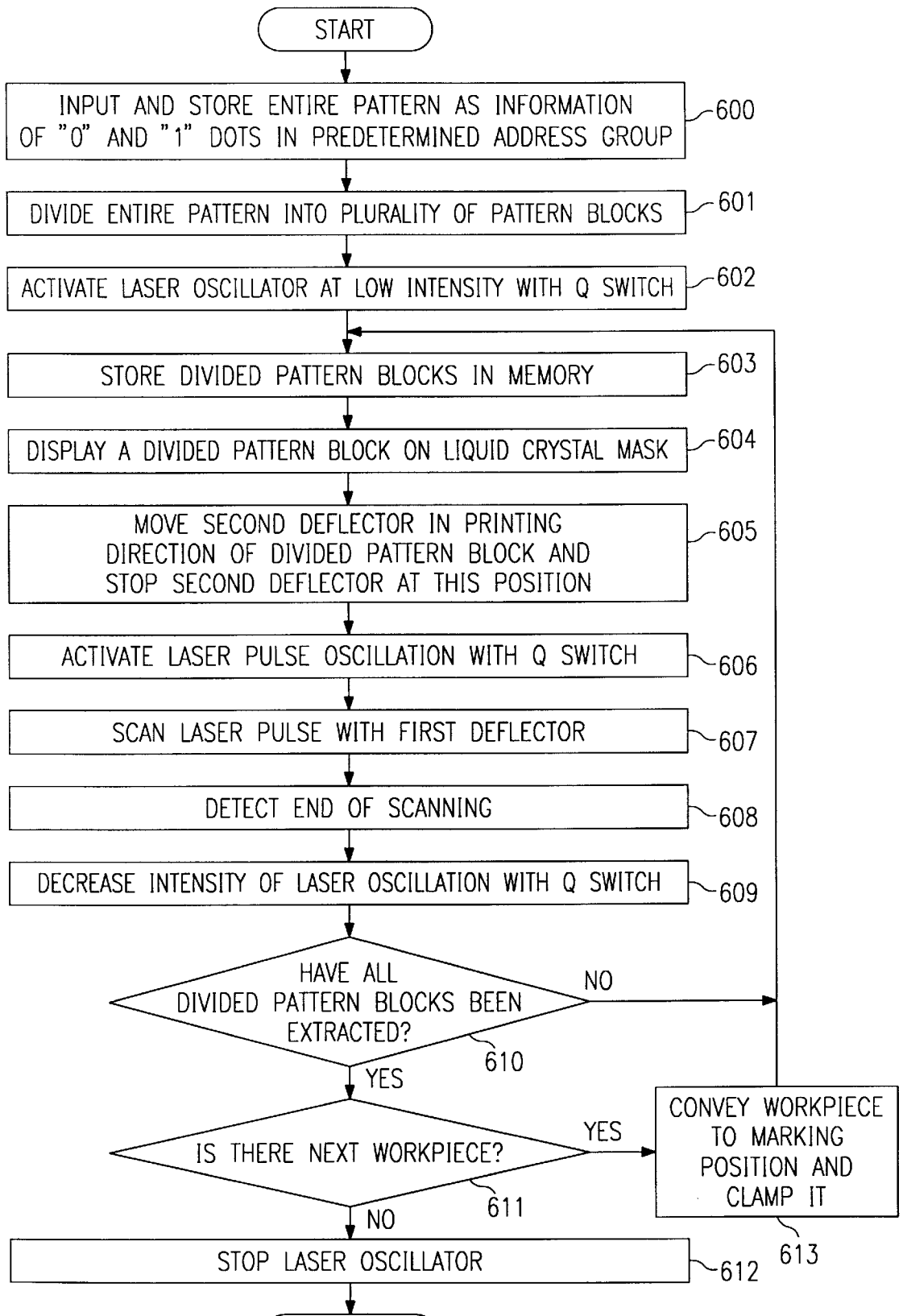
FIG. 15 is a flow chart showing a process of the laser marking apparatus.

The controller 70 controls the liquid crystal mask 66, the drive motor 63b of the first deflector 63, the Q switch of the laser oscillator 61, the drive motor 71 of the X direction deflector 7X in the second deflector 67, and the drive motor 72 of the Y direction deflector 7Y. As shown in FIG. 15, the computer 78 of the laser marking apparatus 68 generates an entire pattern to be marked on a workpiece 74. The overall pattern, which is dot information composed of 0's and 1's is stored at a predetermined address group of the main memory (at step 600). The entire pattern information is divided into a plurality of line-shaped pattern blocks (at step 601). The controller 70 activates the laser oscillator 61 and the Q switch decreases the intensity of laser light radiated by the laser oscillator 61 (at step 602). One line-shaped divided pattern block is sent from the main memory to a temporary memory of the controller 70 (at step 603). A divided pattern block is displayed on the liquid crystal mask 66 (at step 604). The width of each line pattern block to be displayed accords with the width of each line that is scanned in the X direction by the polygon mirror 63a at a time.

The controller 70 moves the second deflector 67 in the marking direction of the workpiece 74 according to an address information of a divided pattern block (at step 605). The Q switch causes the laser oscillator 61 to generate laser light (at step 606). The first deflector 63 scans the liquid crystal mask 66 (at step 607). After the controller 70 has determined that the first deflector 63 has scanned the divided pattern block (at step 608), the Q switch causes the intensity of laser oscillation to lower (at step 609 ).

The controller 70 repeats the steps 603 to 609 until all the divided pattern blacks have been extracted, namely the entire pattern has been marked on the workpiece 74 (at step 610). After the combined pattern has been marked, when there is no workpiece 74 to be marked, the controller 70 stops the oscillation of the laser oscillator 61 (at steps 611 and 612). On the other hand, when there is a workpiece 74 to be marked, the controller 70 waits until the workpiece 74 is conveyed to the marking position (at step 613). When the same pattern is marked on the workpiece 74, the controller 70 performs the divided pattern block extracting step (at step 603). Thus, the entire pattern is marked on the workpiece 74.

When a different pattern is marked on a workpiece 74, a new entire pattern that is dot information is stored in the main memory of the controller 70 (at step 600). Thereafter, the controller 70 repeats the similar steps.

Figure 16:
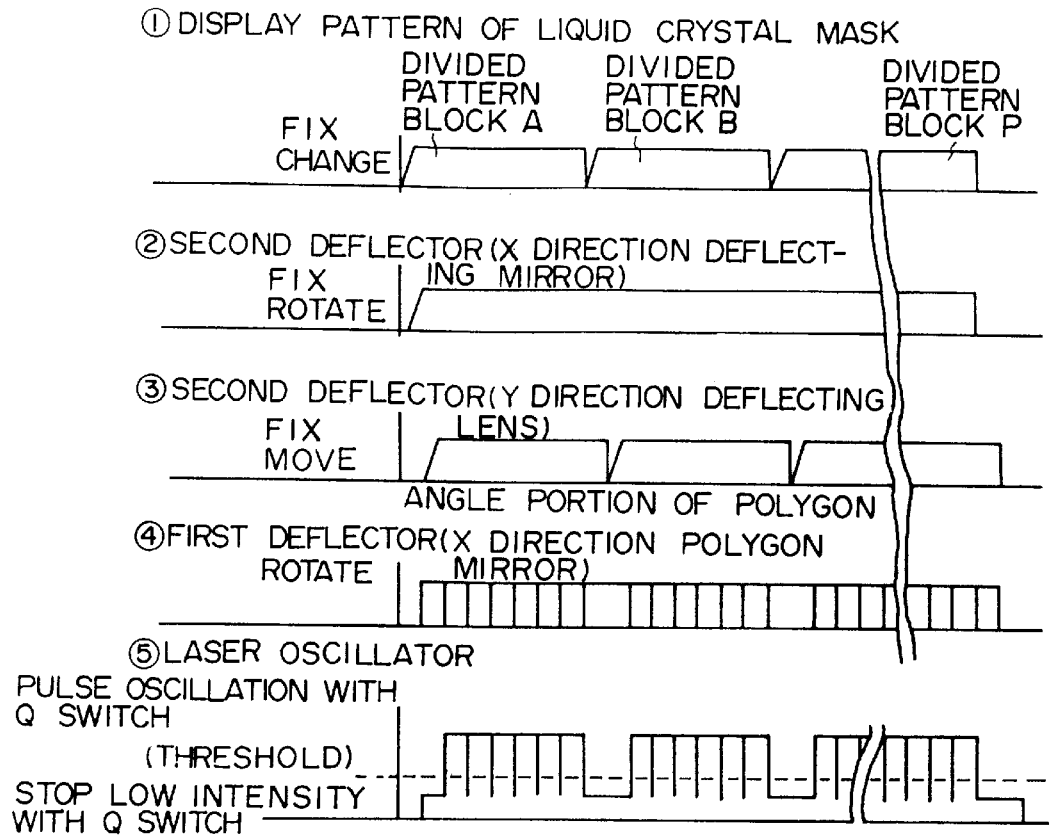
FIG. 16 is a timing chart showing an operation of the laser marking apparatus.

Assume that an entire pattern 90 composed of a FIG. 91 and letters 92 shown in FIG. 17 is stored in the main memory of the controller 70. In other words, marking information composed of 1's that are marking portions and 0's that are non-marking portions are stored in a memory space of 256 horizontal dots×128 vertical dots of the main memory. The marking information is divided into 16 line-shaped divided pattern blocks A to P. As shown in FIG. 16, the controller 70 controls the following operations. The liquid crystal mask 66 displays the divided pattern blocks A to P, one after the other (operation 1). The X direction deflector 7X of the second deflector 67 moves to the marking start position of the workpiece 74 and stops at this position until the entire pattern has been marked on the workpiece 74 (operation 2). The Y direction deflector 7Y of the second deflector 67 moves to the marking start position and stops at this position when the divided pattern block A is displayed on the liquid crystal mask 66 (operation 3). When the divided pattern block B is displayed on the liquid crystal mask 66, the Y direction deflector 7Y deflects laser light by the pattern divided pitch and scans the workpiece 74 so as to mark the workpiece 74 at the marking position following the marked divided pattern block A (operation 3'). This operation (3') is performed whenever the display pattern block on the liquid crystal mask 66 is changed. During these operations, the first deflector 63 scans the divided pattern block displayed on the mask 66 in the X direction and radiates the transmitted laser light to the second deflector 67 (operation 4). The laser oscillator 61 oscillates only while the first deflector 63 scans each divided pattern block in the X direction (operation 5). When the divided pattern block is changed, the oscillation intensity is decreased by the Q switch.

The controller 70 receives a signal from a drive motor 75*a* (that is connected to a table 75 on which a large number of workpieces 74 are placed) and signals from sensors 76 and 77 that detect whether or not a workpiece 74 that is moved by the drive motor 75*a* has arrived at a predetermined marking position. The controller 70 adjusts the operation timing to the table 75 and causes the same entire pattern that is a composite pattern to be marked on each workpiece 74.

According to this embodiment, since laser light that is radiated through a pattern displayed on the liquid crystal mask 66 is scanned only in one direction, the scanning control mechanism and the control operations thereof become very simple, thereby increasing the marking speed. In addition, the YAG laser does not apply much heat to the optical system. The first deflector 63 performs so-called pin-point radiation unlike with conventional non-spot radiation due to beam spreading. Thus, the laser radiation to the liquid crystal mask 66 is equalized and intensified. Moreover, since the laser oscillator 61 has the Q switch, the peak value of the irradiated laser intensity can be increased. Furthermore, since the liquid crystal mask 66 does not need a deflecting plate, the intensity of the transmitted laser light is at least twice that of the conventional apparatus. Thus, in addition to the decrease of the size of the YAG laser oscillator 61, the intensified laser beam is scanned to the liquid crystal mask 66 in one direction, thereby clearly marking each workpiece.

The second deflector 67 can mark a large combined pattern on each workpiece 74 without the need to move the workpiece 74. Since the light converging optical system converges deflected incident laser light with a large diameter into a sharp laser beam, the deformation and deflection of marking, laser loss, and so forth can be reduced. In addition, the size of each deflector can be reduced. The controller 70 optimally controls the driving of the first deflector 63, the display switching of the liquid crystal mask 66, the driving of the second deflector 67, and the timing of the Q switch. In particular, the Q switch allows the oscillation intensity of laser light that is not necessary for marking a workpiece to be decreased, thereby preventing the laser beam from scattering to other portions of the system. Thus, the system can mark workpieces that are made of metal, ceramic, and so forth with a combined pattern. In addition, the apparatus can be prevented from being damaged by high intensity laser light.

Next, with reference to FIGS. 18 and 19A to 19C, a fourth embodiment of the present invention will be described.

The construction of the fourth embodiment is the same as that of the third embodiment except for a laser light input portion and a laser light output portion including the liquid crystal mask 66 of the third embodiment shown in FIG. 13 are modified so as to improve the marking alignment accuracy of the laser beam. The same parts as the third embodiment are denoted by the same reference numerals and their description is omitted.

Figure 18:
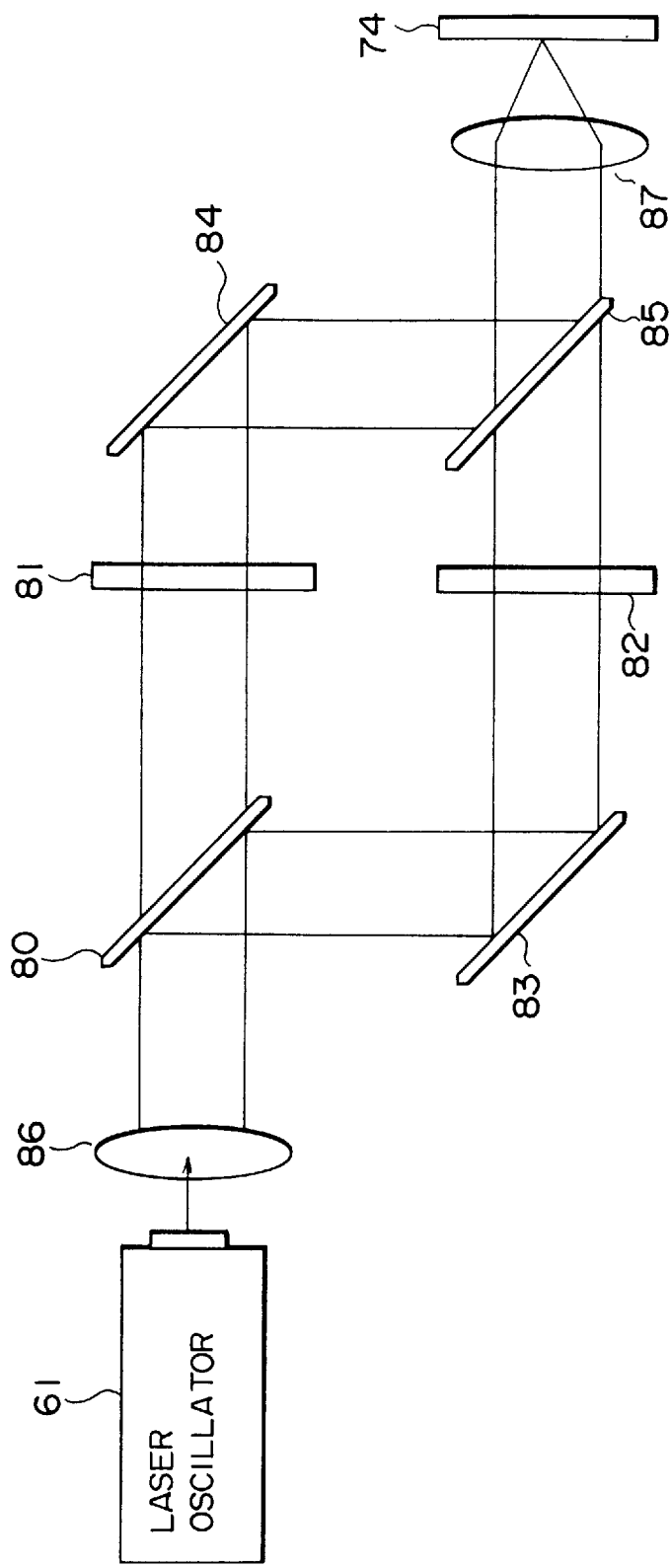
FIG. 18 is a schematic diagram for explaining a principal portion of a laser marking apparatus according to a fourth embodiment of the present invention.

As shown in FIG. 18, a laser light radiated by the laser oscillator 61 is transmitted to a beam splitter 80 through an expander lens 86 that is a first optical system as shown in FIG. 18. The beam splitter 80 divides the laser light into two optical paths. In this optical system, a first liquid crystal mask 81 and a second liquid crystal mask 82 are provided. The first liquid crystal mask 81, which is disposed in the first optical path, receives the transmitted light of the beam splitter 80. Simultaneously, the second liquid crystal mask 82 receives the reflected light of a mirror 83 disposed in the second optical path. The output rays of light of the first and second liquid crystal masks 81 and 82 are combined by a mirror 84 and a beam splitter 85 that are a second optical system. The combined light is radiated to a workpiece 74 through a condenser lens 87.

Figure 19A:
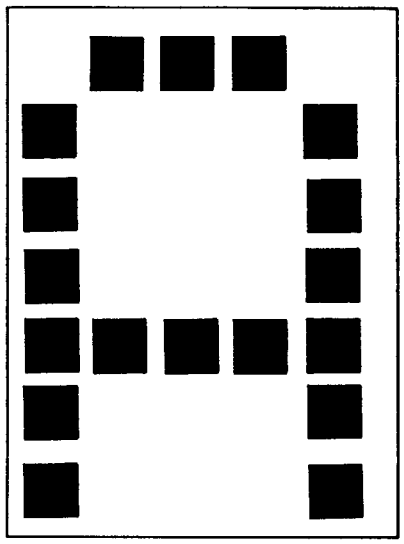
FIGS. 19A, 19B, and 19C are schematic diagrams for explaining mask display patterns and their combined pattern according to the fourth embodiment.
Figure 19B:
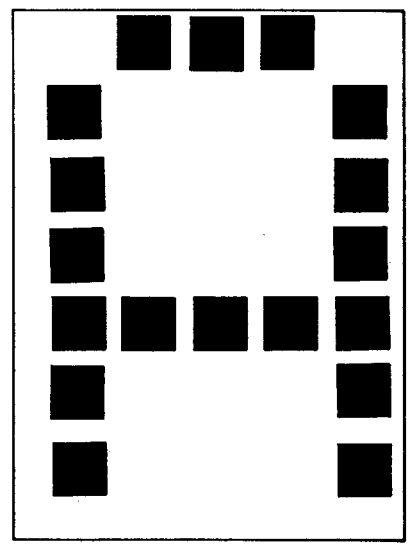
Figure 19C:
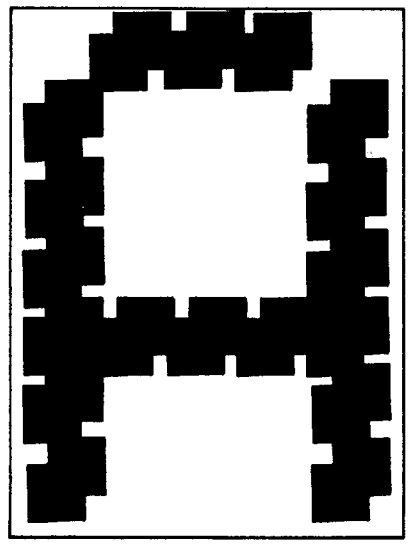

Although the display pattern on the first liquid crystal mask 81 is the same as a display pattern on the second liquid crystal mask 82, a display portion of the first liquid crystal mask 81 differs from a display portion of the second liquid crystal mask 82 so that a gap therebetween is filled with the display pattern. In other words, although the display pattern of the first liquid crystal mask 81 is the same as the display pattern of the second liquid crystal mask 82 as shown in FIGS. 19A and 19B, the display pattern of the first liquid crystal mask 81 is placed at a lower left position and the display pattern of the second liquid crystal mask 82 is placed at a upper right position. The combined pattern is displayed so that the gap between mask dots of the first and second liquid crystal masks 81 and 82 are filled as shown in FIG. 19C. The display positions of the first and second liquid crystal masks 81 and 82 can be dislocated when they are fabricated or by adjusting them. Transmission mask type compound dispersing liquid crystals are used as the first and second liquid crystal masks 81 and 82. When an appropriate optical system is used, another type of liquid crystal masks such as TN liquid crystal can be used.

When such a construction is applied for the laser marking apparatus shown in FIG. 13, the beam splitter 80 and the mirror 83 are disposed on the input side of the first deflector 63. In addition, a pair of first deflectors 63 are provided so as to separately scan the first and second liquid crystal masks 81 and 82. Moreover, the mirror 84 and the beam splitter 85 are disposed on the input side of the second deflector 67. The combined pattern received from the second deflector 67 is marked on the workpiece 74.

Since the gaps between mask dots of the transmitting type liquid crystal mask are filled, each workpiece can be clearly marked, and the marking position accuracy can be improved.

INDUSTRIAL UTILIZATION

According to the present invention, since the entire operation time between a workpiece loading and unloading operation of a workpiece conveying apparatus and a marking operation of a marking apparatus is optimally designated, a large number of workpieces can be marked in a short time. In particular, when divided pattern blocks are displayed on a mask so as to mark a workpiece, the marking position accuracy is improved and the marking operation can be easily performed.

What is claimed is:

1. A laser marking system for marking a workpiece, said system comprising:

a laser oscillator;

a mask;

a first deflector for scanning in only one direction onto said mask, as only a single scanning line, a laser light generated by said laser oscillator;

said mask being adapted for displaying divided pattern blocks, each of said divided pattern blocks being equivalent to a single scanning line, wherein the divided pattern blocks constitute a marking pattern;

a second deflector for deflecting onto a surface of said workpiece a thus scanned laser light which has been selectively transmitted by said mask; and a controller, wherein said controller causes said mask to sequentially display the divided pattern blocks of the marking pattern, and wherein said controller causes said second deflector to deflect the thus scanned laser light for each divided pattern block to corresponding portions of the surface of said workpiece so as to mark on the surface of said workpiece a combined pattern as thus scanned by said first deflector and said second deflector.

2. A laser marking system in accordance with claim 1, further comprising:

a first optical system for directing, into a plurality of paths, laser light which has been generated by said laser oscillator;

a plurality of masks, including said mask, each of said masks being disposed in a respective one of said paths, each of said masks being adapted for displaying an image in the form of mask dots; and a second optical system for combining, into a single beam, light transmitted by said masks; and a plurality of first deflectors, including said first deflector, disposed between said first optical system and said masks so as to separately scan each respective one of said plurality of masks;

wherein said second deflector is disposed downstream of said second optical system and deflects said single beam onto a surface of said workpiece; and wherein said controller provides said masks with the same image at slightly different positionings, so as to fill gaps between mask dots with the same image, for marking on said workpiece a combined pattern scanned by said first deflector and said second deflector.

3. A laser marking system in accordance with claim 2, further comprising:

a supply unit;

a loader for transferring the workpiece to said supply unit;

at least one clamp for clamping the thus transferred workpiece on said supply unit;

a positioning unit;

a first driver for providing relative movement between the supply unit, with the thus transferred workpiece, and said positioning unit so as to supply the workpiece from the supply unit to the positioning unit;

at least one clamp for clamping to said positioning unit the thus supplied workpiece;

said positioning unit and the workpiece thereon being positionable so that the transmission of said single beam to the workpiece on said positioning unit marks a desired pattern at a desired location on a surface of the workpiece;

a second driver for providing relative movement between the positioning unit, with the thus marked workpiece, and a discharge unit so as to transfer the thus marked workpiece from the positioning unit to the discharge unit;

at least one clamp for clamping to said discharge unit the thus transferred marked workpiece;

an unloader; and a third driver for moving said discharge unit, having the marked workpiece thereon, to said unloader, for transferring the marked workpiece from said discharge unit to said unloader.

4. A laser marking system in accordance with claim 3, wherein the movement of each of said supply unit, said positioning unit, and said discharge unit is along an axis of a conveying direction of the workpiece.

5. A laser marking system in accordance with claim 4, wherein said supply unit is mounted on a first screw shaft for movement along said first screw shaft, said first screw shaft being rotatably driven by said first driver; wherein said positioning unit is mounted on a second screw shaft for movement along said second screw shaft, said second screw shaft being rotatably driven by said second driver; wherein said discharge unit is mounted on a third screw shaft for movement along said third screw shaft, said third screw shaft being rotatably driven by said third driver; and wherein each of said first screw shaft, said second screw shaft, and said third screw shaft is parallel to the conveying direction of the workpiece.

6. A laser marking method for marking a surface of a workpiece, said method comprising the steps of:

generating a laser light beam;

scanning the thus generated laser light beam in a single direction onto a mask as a single scanning line;

causing said mask to sequentially display a plurality of divided pattern blocks, with each of said divided pattern blocks being equivalent to a single scanning line, wherein the divided pattern blocks collectively constitute a marking pattern; and deflecting each thus scanned laser light beam, which corresponds to a respective divided pattern block and which has been selectively transmitted by said mask, onto a corresponding portion of the surface of said workpiece so as to mark on the surface of said workpiece a combination of said divided pattern blocks as said marking pattern.

7. A laser marking method in accordance with claim 6, wherein said step of causing said mask to sequentially display a plurality of divided pattern blocks comprises, for each respective divided pattern block:

simultaneously displaying on a plurality of masks a particular marking pattern, in the form of mask dots, for the respective divided pattern block with each such displaying of the particular marking pattern being at a slightly different positioning so as to fill gaps between mask dots of the particular marking pattern;

wherein said step of scanning the thus generated laser light beam onto a mask as a single scanning line comprises:

optically dividing the thus generated laser light beam into a plurality of laser paths, and scanning the laser light in each respective one of said paths onto a respective one of said plurality of masks as a single scanning line for the respective mask; and wherein said step of deflecting each thus scanned laser light beam comprises:

optically combing, into a single beam, the light transmitted by said plurality of masks for the respective divided pattern block and directing said single beam onto the surface of the workpiece so as to mark on the surface of said workpiece the respective divided pattern block.

8. A laser marking method in accordance with claim 7, further comprising the steps of:

transferring the workpiece from a loader to a supply unit;

clamping the thus transferred workpiece on said supply unit;

providing relative movement between the supply unit, with the thus transferred workpiece, and a positioning unit so as to supply the workpiece from the supply unit to the positioning unit;

clamping to said positioning unit and then unclamping from said supply unit the thus supplied workpiece;

positioning said positioning unit and the workpiece thereon so that the transmission of said single beam to the workpiece on said positioning unit marks a desired pattern at a desired location on a surface of the workpiece;

providing relative movement between the positioning unit, with the thus marked workpiece, and a discharge unit so as to transfer the thus marked workpiece from the positioning unit to the discharge unit;

clamping to said discharge unit and then unclamping from said positioning unit the thus marked workpiece;

moving said discharge unit, having the marked workpiece thereon, to an unloader; and transferring the marked workpiece from said discharge unit to said unloader.

9. A laser marking method comprising the steps of:

generating a laser light beam;

displaying on each of a plurality of masks, which selectively transmit laser light, a particular marking pattern in the form of mask dots with gaps between the mask dots;

optically dividing the thus generated laser light beam into a plurality of laser paths and scanning the laser light in each of said paths onto a respective one of said plurality of masks;

optically combining, into a single beam, the light transmitted by said plurality of masks; and directing said single beam onto a surface of a workpiece to mark a desired pattern on said surfaces;

wherein said step of displaying provides that each such display of the particular marking pattern on the masks is at a slightly different positioning with respect to other such displays so that when said single beam marks the desired pattern on said surface of the workpiece, markings corresponding to mask dots of one such display of the particular marking pattern at least partially fill gaps between markings corresponding to mask dots in another such display of the same particular marking pattern.

10. A laser marking method in accordance with claim 9, further comprising the steps of:

transferring the workpiece from a loader to a supply unit;

clamping the thus transferred workpiece on said supply unit;

providing relative movement between the supply unit, with the thus transferred workpiece, and a positioning unit so as to supply the workpiece from the supply unit to the positioning unit;

clamping to said positioning unit and then unclamping from said supply unit the thus supplied workpiece;

positioning said positioning unit and the workpiece thereon so that the transmission of said single beam to the workpiece on said positioning unit marks a desired pattern at a desired location on a surface of the workpiece;

providing relative movement between the positioning unit, with the thus marked workpiece, and a discharge unit so as to transfer the thus marked workpiece from the positioning unit to the discharge unit;

clamping to said discharge unit and then unclamping from said positioning unit the thus marked workpiece;

moving said discharge unit, having a marked workpiece thereon, to an unloader; and transferring the marked workpiece from said discharge unit to said unloader.

11. A laser marking system for marking a workpiece, said system comprising:

a laser oscillator for generating a laser light beam;

a plurality of masks, which selectively transmit laser light;

a first optical system for optically dividing the thus generated laser light beam into a plurality of laser paths so that the laser light in each of said paths can be scanned onto a respective one of said plurality of masks;

a controller for displaying on said plurality of masks a particular marking pattern in the form of mask dots with gaps between the mask dots; and a second optical system for optically combining, into a single beam, light transmitted by said plurality of masks so that the single beam can be directed onto a surface of the workpiece to mark a desired pattern on said surfaces;

wherein said controller provides that each such displaying of the particular marking pattern on the masks is at a slightly different positioning with respect to other such displayings so that when said single beam marks the desired pattern on said surface of the workpiece, markings corresponding to mask dots of one such displaying of the particular marking pattern at least partially fill gaps between markings corresponding to mask dots in another such displaying of the same particular marking pattern.

12. A laser marking system in accordance with claim 11, further comprising:

a plurality of first deflectors disposed between said first optical system and said masks so as to separately scan each respective one of said plurality of masks with laser light from a respective one of said paths; and a second deflector which is disposed downstream of said second optical system and which deflects the single beam onto a surface of said workpiece.

13. A laser marking system in accordance with claim 11, wherein each of said plurality of masks is a transmission type liquid crystal mask.

14. A laser marking system for marking a workpiece, said system comprising:

a laser oscillator for generating a laser light beam;

a plurality of masks, which selectively transmit laser light;

a first optical system for optically dividing the thus generated laser light beam into a plurality of laser paths so that the laser light in each of said paths can be scanned onto a respective one of said plurality of masks;

a controller for displaying on said plurality of masks a particular marking pattern in the form of mask dots with each such displaying being at a slightly different positioning so as to fill gaps between mask dots with the same marking pattern;

a second optical system for optically combining, into a single beam, light transmitted by said plurality of masks so that the single beam can be directed onto a surface of the workpiece to mark a desired pattern on said surface;

a supply unit;

a loader for transferring the workpiece to said supply unit;

at least one clamp for clamping the thus transferred workpiece on said supply unit;

a positioning unit;

a first driver for providing relative movement between the supply unit, with the thus transferred workpiece, and said positioning unit so as to supply the workpiece from the supply unit to the positioning unit;

at least one clamp for clamping to said positioning unit the thus supplied workpiece;

said positioning unit and the workpiece thereon being positionable so that the transmission of said single beam to the workpiece on said positioning unit marks a desired pattern at a desired location on a surface of the workpiece;

a second driver for providing relative movement between the positioning unit, with the thus marked workpiece, and a discharge unit so as to transfer the thus marked workpiece from the positioning unit to the discharge unit;

at least one clamp for clamping to said discharge unit the thus transferred marked workpiece;

an unloader; and a third driver for moving said discharge unit, having a marked workpiece thereon, to said unloader, for transferring the marked workpiece from said discharge unit to said unloader.

15. A laser marking system in accordance with claim 14, wherein the movement of each of said supply unit, said positioning unit, and said discharge unit is along an axis of a conveying direction of the workpiece.

16. A laser marking system in accordance with claim 15, wherein said supply unit is mounted on a first screw shaft for movement along said first screw shaft, said first screw shaft being rotatably driven by said first driver; wherein said positioning unit is mounted on a second screw shaft for movement along said second screw shaft, said second screw shaft being rotatably driven by said second driver; wherein said discharge unit is mounted on a third screw shaft for movement along said third screw shaft, said third screw shaft being rotatably driven by said third driver; and wherein each of said first screw shaft, said second screw shaft, and said third screw shaft is parallel to said conveying direction of the workpiece.

17. A laser marking system for marking a workpiece, said system comprising:

a laser marking apparatus, said laser marking apparatus having a laser oscillator, a mask, a first deflector for scanning onto said mask laser light generated by said laser oscillator, a second deflector for directing onto a surface of a workpiece light transmitted by said mask, and a marking data generating computer; and a workpiece conveying apparatus for conveying a workpiece along a workpiece conveying axis, said workpiece conveying apparatus including:

a supply unit;

a loader for transferring to said supply unit a workpiece to be marked;

a positioning unit;

a first driver for providing relative movement between the supply unit, with a thus transferred workpiece, and said positioning unit along the workpiece conveying axis so as to supply a workpiece from the supply unit to the positioning unit;

said positioning unit and a workpiece thereon being positionable only along said workpiece conveying axis so that the directing by the second deflector of light transmitted by said mask to the workpiece on said positioning unit marks a desired pattern at a desired location on a surface of the workpiece;

a second driver for providing relative movement between the positioning unit, with a thus marked workpiece, and a discharge unit along the workpiece conveying axis so as to transfer a thus marked workpiece from the positioning unit to the discharge unit;

an unloader;

a third driver for moving said discharge unit, having a marked workpiece thereon, to said unloader, for transferring the marked workpiece from said discharge unit to said unloader; and a controller for controlling said first driver, said second driver, and said third driver.

18. A laser marking system in accordance with claim 17, further comprising:

at least one first clamp for clamping a transferred workpiece on said supply unit;

at least one second clamp for clamping to said positioning unit a supplied workpiece;

at least one third clamp for clamping to said discharge unit a transferred marked workpiece; and a controller for actuating said at least one first clamp to clamp the transferred workpiece on said supply unit, for actuating said at least one second clamp to clamp the supplied workpiece to said positioning unit and then for actuating said at least one first clamp to unclamp the workpiece which has been supplied to said positioning unit, for actuating said at least one third clamp to clamp the transferred marked workpiece to said discharge unit and then for actuating said at least one second clamp to unclamp the marked workpiece which has been transferred to said discharge unit.

19. A system in accordance with claim 17, wherein said supply unit is mounted on a first screw shaft for movement along said first screw shaft, said first screw shaft being rotatably driven by said first driver; wherein said positioning unit is mounted on a second screw shaft for movement along said second screw shaft, said second screw shaft being rotatably driven by said second driver; wherein said discharge unit is mounted on a third screw shaft for movement along said third screw shaft, said third screw shaft being rotatably driven by said third driver; and wherein each of said first, second, and third screw shafts has an axis which is parallel to the conveying axis.

20. A laser marking system in accordance with claim 17, wherein the movement of each of said supply unit, said positioning unit, and said discharge unit is only along the conveying axis.

21. A laser marking system in accordance with claim 17, wherein said first deflector scans laser light onto said mask only in a single direction.

22. A laser marking system in accordance with claim 17 further comprising an installation plate, said workpiece conveying apparatus being mounted on said installation plate, a fourth driver for raising and lowering said installation plate, and wherein said controller controls said fourth driver so as to adjust the position of said installation plate to focus on said workpiece the light which is directed by said second deflector.

23. A laser marking system for marking a workpiece, said system comprising:

a laser marking apparatus, said laser marking apparatus having a laser oscillator, a mask, a first deflector for scanning onto said mask laser light generated by said laser oscillator, a second deflector for directing onto a surface of a workpiece light which has been transmitted by said mask, and a marking data generating computer; and a workpiece conveying apparatus, said workpiece conveying apparatus including:

a first supply and discharge unit;

a second supply and discharge unit;

a first loader and unloader unit for loading a workpiece to be marked onto said first supply and discharge unit and for removing a marked workpiece from said first supply and discharge unit;

a second loader and unloader unit for loading onto said second supply and discharge unit a workpiece to be marked and for removing a marked workpiece from said second supply and discharge unit;

a positioning unit for positioning a workpiece so that light directed by said second deflector marks the surface of the thus positioned workpiece;

a first driver for providing relative movement between the first supply and discharge unit and said positioning unit along a workpiece conveying axis so as to supply a workpiece from the first supply and discharge unit to the positioning unit and to discharge a workpiece from said positioning unit to said first supply and discharge unit;

a second driver for providing relative movement between the second supply and discharge unit and said positioning unit along the workpiece conveying axis so as to supply a workpiece from the second supply and discharge unit to the positioning unit and to discharge a workpiece from said positioning unit to said second supply and discharge unit; and a controller for controlling said first driver, said second driver, said first loader and unloader unit, and said second loader and unloader unit;

whereby a workpiece to be marked can be loaded by said first loader and unloader unit onto said first supply and discharge unit, then transferred from said first supply and discharge unit onto said positioning unit, then marked while on said positioning unit, then transferred from said positioning unit to said second supply and discharge unit, and then unloaded from said second supply and discharge unit by said second loading and unloading unit; and whereby a workpiece to be marked can be loaded by said second loader and unloader unit onto said second supply and discharge unit, then transferred from said second supply and discharge unit onto said positioning unit, then marked while on said positioning unit, then transferred from said positioning unit to said first supply and discharge unit, and then unloaded from said first supply and discharge unit by said first loading and unloading unit.

24. A laser marking system in accordance with claim 23, wherein said first supply and discharge unit, said positioning unit, and said second supply and discharge unit are movable along a common axis.

\* \* \* \* \*

UNITED STATES PATENT AND TRADEMARK OFFICE
CERTIFICATE OF CORRECTION

PATENT NO. : 5,821,497
DATED : October 13, 1998
INVENTOR(S) : Yamazaki et al

It is certified that error appears in the above-identified patent and that said Letters Patent is hereby corrected as shown below:

Title page, item [73], Assignee

After "Kaisha" insert --Komatsu--.

Column 16, line 57, delete "combing" and insert --combining--.

Column 17, line 36, delete "surfaces" and insert --surface--.

Column 18, line 24, delete "surfaces" and insert --surface--.

Signed and Sealed this

Eighth Day of February, 2000

Attest:

Attesting Officer

Q. TODD DICKINSON

Commissioner of Patents and Trademarks